United States Patent
Pfister

(10) Patent No.: US 12,152,724 B2
(45) Date of Patent: Nov. 26, 2024

(54) REAL ESTATE KEY LOCKBOX STAND ASSEMBLY

(71) Applicant: Lockbox Stand LLC, Kennewick, WA (US)

(72) Inventor: Joshua Pfister, Kennewick, WA (US)

(73) Assignee: Lockbox Stand LLC, Kennewick, WA (US)

( * ) Notice: Subject to any disclaimer, the term of this patent is extended or adjusted under 35 U.S.C. 154(b) by 315 days.

(21) Appl. No.: 17/804,371

(22) Filed: May 27, 2022

(65) Prior Publication Data

US 2023/0003051 A1  Jan. 5, 2023

Related U.S. Application Data

(60) Provisional application No. 63/193,887, filed on May 27, 2021.

(51) Int. Cl.
| | |
|---|---|
| *F16M 11/20* | (2006.01) |
| *E05B 19/00* | (2006.01) |
| *F16M 11/10* | (2006.01) |

(52) U.S. Cl.
CPC ..... *F16M 11/2021* (2013.01); *E05B 19/0005* (2013.01); *F16M 11/10* (2013.01)

(58) Field of Classification Search
CPC ............... F16M 11/10; F16M 11/2021; E05B 19/0005; G09F 2007/1804; G09F 2007/1808; G09F 2007/1813; G09F 2007/1817; G09F 2007/1821; G09F 2007/1826; G09F 2007/183

USPC ...................................... 40/606.15; 248/158
See application file for complete search history.

(56) References Cited

U.S. PATENT DOCUMENTS

| | | | | |
|---|---|---|---|---|
| 1,606,369 | A * | 11/1926 | Johnston ................... | G09F 1/14 248/457 |
| 2,167,564 | A * | 7/1939 | Fonda ..................... | E01F 9/688 40/607.1 |
| 2,613,463 | A * | 10/1952 | Transue ................. | B60Q 7/005 116/63 P |
| 3,235,214 | A * | 2/1966 | Sprung ................. | E01F 13/123 40/607.1 |
| 3,683,527 | A * | 8/1972 | Gilman ................... | G09F 17/00 40/604 |
| 3,786,656 | A * | 1/1974 | Suprowich .......... | E05B 19/0005 70/456 R |
| 4,019,271 | A * | 4/1977 | Latimer .................. | E01F 9/688 116/63 P |
| 4,718,624 | A * | 1/1988 | Greulich .................. | H04R 1/08 248/291.1 |
| 5,220,740 | A * | 6/1993 | Brault .................... | F16M 11/42 40/607.1 |

(Continued)

*Primary Examiner* — Eret C McNichols
(74) *Attorney, Agent, or Firm* — Stephen S. Zimowski

(57) ABSTRACT

The present invention provides a lockbox stand for attaching a key-containing device with a lockable compartment, the lockbox stand including a base assembly and a post assembly connected by a connection assembly; the connection assembly provides a mechanism for extending and collapsing the post assembly such that, when collapsed, the post extends parallel to the ground and, when upright, the post extends perpendicular to the ground and portrays a sign with an inviting message welcoming visitors to the property, be they potential buyers or just friends or acquaintances visiting with the owners of the home.

20 Claims, 19 Drawing Sheets

(56) References Cited

U.S. PATENT DOCUMENTS

| | | | | |
|---|---|---|---|---|
| 5,566,030 | A * | 10/1996 | Yue | A45D 42/00 |
| | | | | 359/872 |
| 5,590,608 | A * | 1/1997 | Yore | E05B 19/0005 |
| | | | | 70/2 |
| 5,732,911 | A * | 3/1998 | Kulp | E01F 9/688 |
| | | | | 40/607.1 |
| 5,875,578 | A * | 3/1999 | Grewe | E01F 9/692 |
| | | | | 40/608 |
| 6,003,827 | A * | 12/1999 | Kulp | G09F 15/0062 |
| | | | | 248/176.1 |
| 6,626,410 | B2 * | 9/2003 | Marcotte | E01F 9/688 |
| | | | | 248/548 |
| 7,140,581 | B1 * | 11/2006 | White | E01F 9/692 |
| | | | | 40/607.1 |
| 7,243,450 | B2 * | 7/2007 | Dicke | G09F 15/0056 |
| | | | | 40/607.1 |
| 7,571,561 | B1 * | 8/2009 | Garcia | G09F 19/22 |
| | | | | 116/63 P |
| 9,003,682 | B2 * | 4/2015 | Garfinkle | G09F 7/18 |
| | | | | 40/606.15 |
| 10,403,185 | B2 * | 9/2019 | Jensen | G09F 21/043 |
| 2005/0247780 | A1 * | 11/2005 | Lowry | G09F 3/208 |
| | | | | 235/383 |
| 2010/0199534 | A1 * | 8/2010 | Larsen | G09F 7/18 |
| | | | | 40/606.01 |
| 2014/0026451 | A1 * | 1/2014 | Gillespie | G09F 13/04 |
| | | | | 40/578 |
| 2017/0154550 | A1 * | 6/2017 | Sauerwald | G09F 7/18 |

* cited by examiner

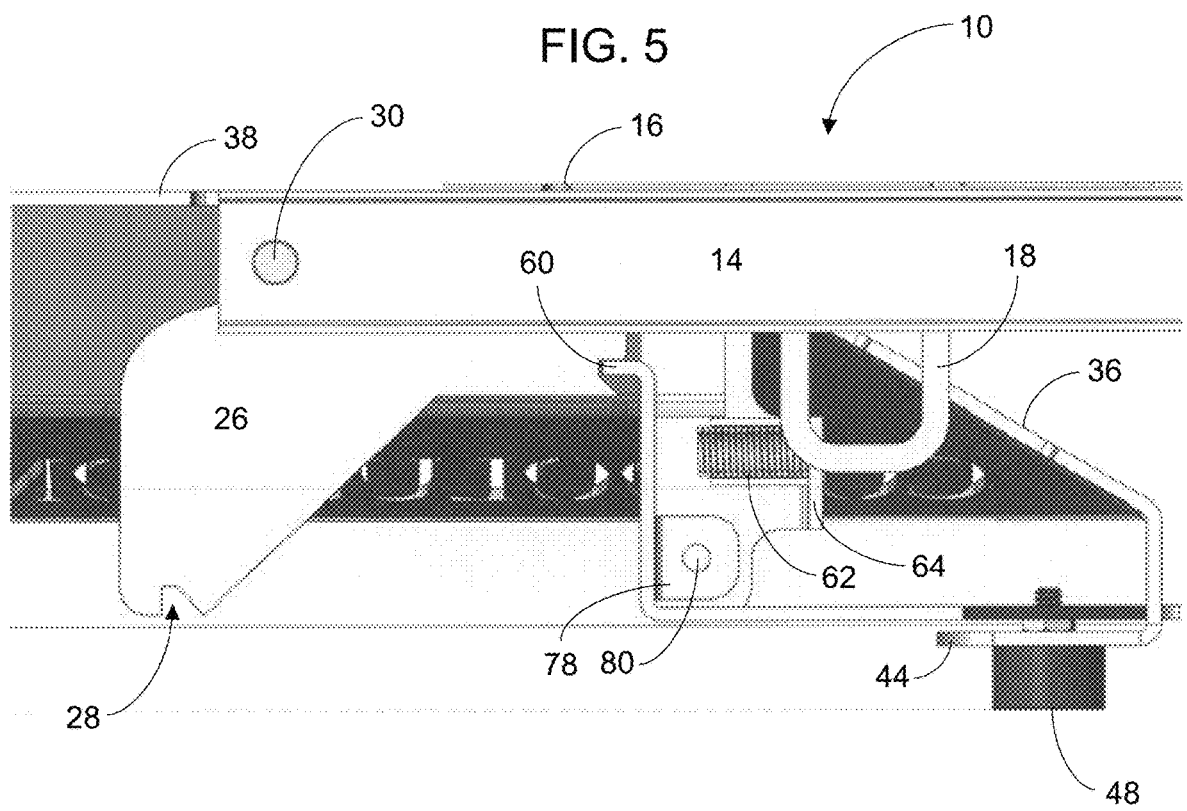

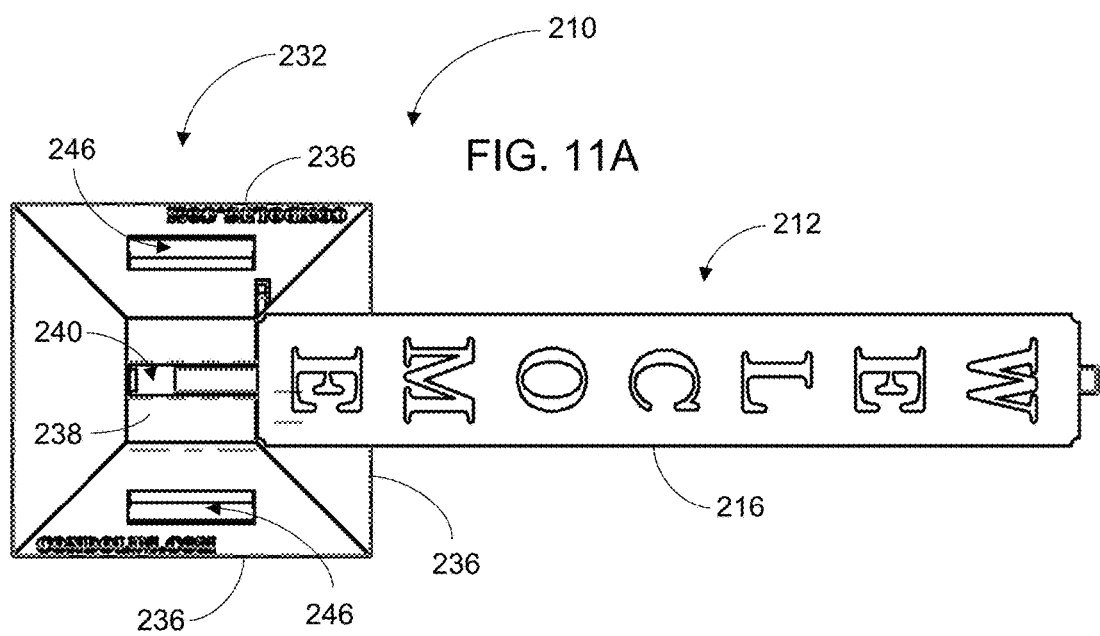
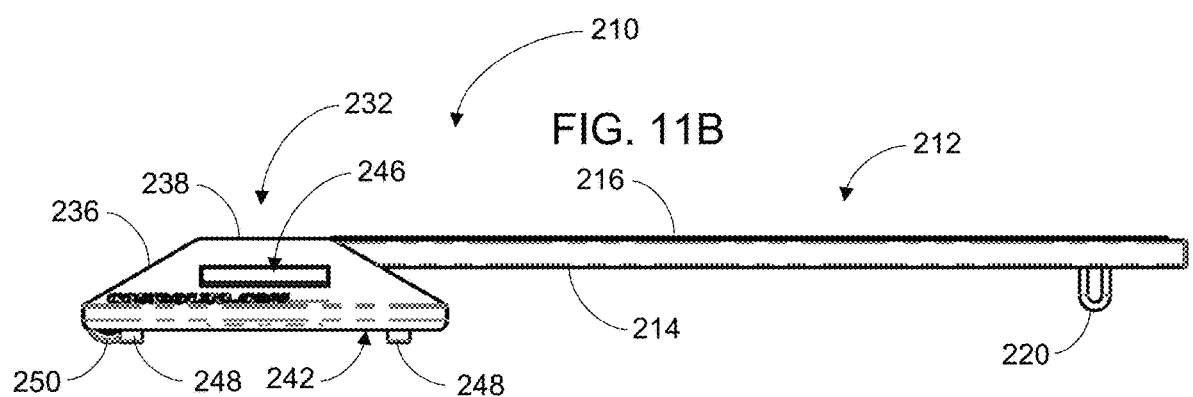

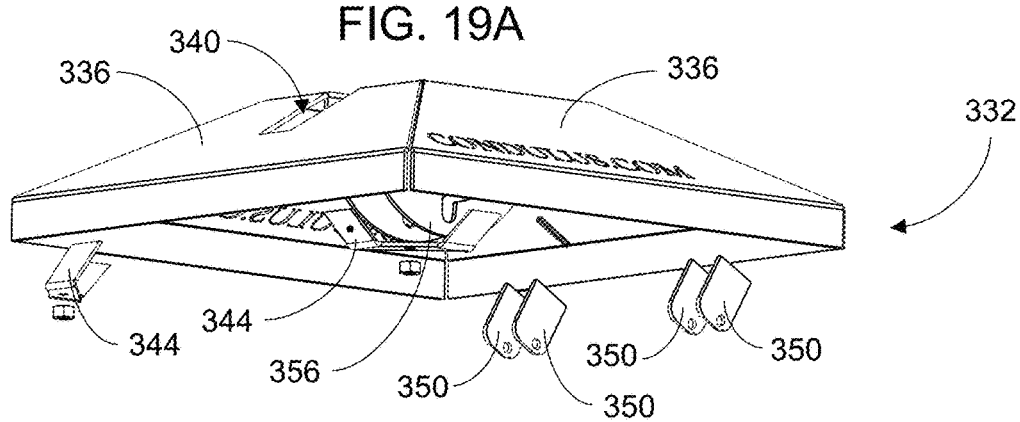
FIG. 19A
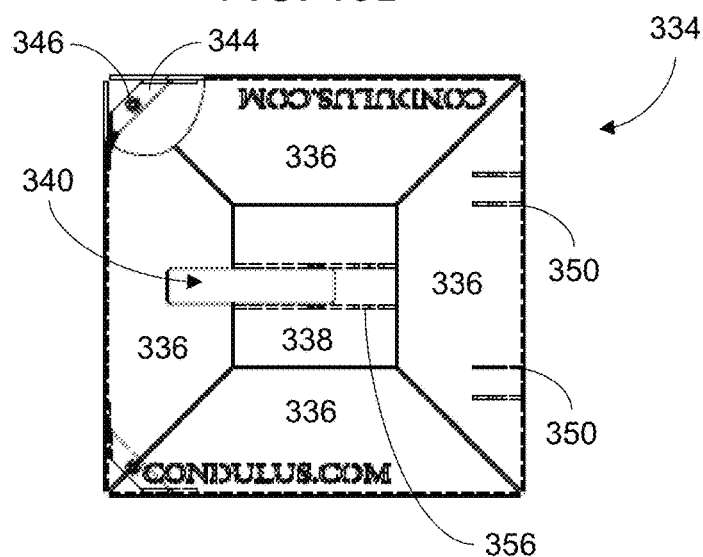
FIG. 19B
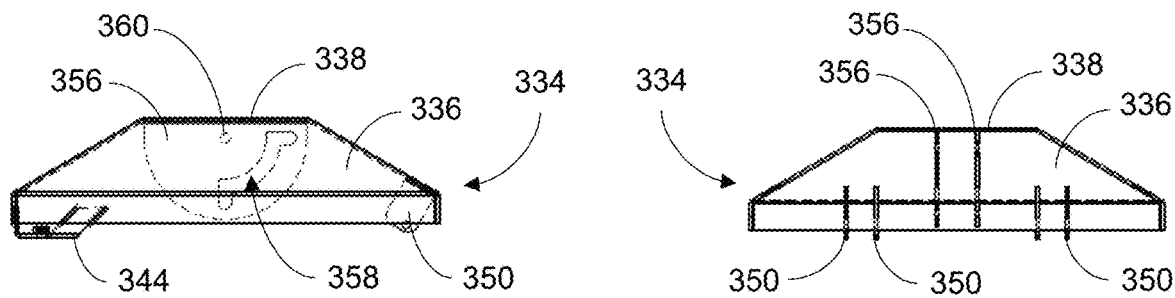
FIG. 19C
FIG. 19D

REAL ESTATE KEY LOCKBOX STAND ASSEMBLY

FIELD OF THE INVENTION

The invention relates to securing spare keys for accessing real estate locations, and more specifically to a stand assembly for securing spare keys for use by real estate agents to access real estate locations for purposes of sale.

BACKGROUND OF THE INVENTION

As anyone who has ever been accidentally locked out of their home can attest, having a spare key accessible from outside can be very important. Many property owners seek clever ways to hide spare keys outside, under a welcome mat or in an adjacent shed or storage space. Several products exist in the market to assist property owners in this task, such as fake rocks or potting plants with hidden compartments. However, the ever-present risk of unauthorized entry and theft at such properties remains a concern.

So too is this true with respect to selling a piece of property. Providing real estate agents with a spare key to enter a property on the market for sale is common practice. However, the manner of providing spare keys can be problematic and can involve the same concerns regarding unauthorized entry and theft. Those involved in real estate sales are always looking for the most efficient and effective way to store spare keys for use during open houses, etc. in a secure manner.

In some instances, it is appropriate to simply provide a single real estate agent with the spare key(s). However, this approach is limited, especially if a real estate agency responsible for a listing may send one of several agents to the property at any given time. And the agent might forget the key and have to drive back to retrieve it, which could delay a showing and even result in a lost sale. Accordingly, it is generally preferable to securely store the spare key at the real estate location.

Typically in the real estate business, agents and agencies use a classic lockbox device to store the spare keys. These devices typically attach around a door handle or other fixture outside the property or otherwise attach directly to the property. Such devices often employ a code to access the compartment containing the spare key. However, these devices continue to suffer from significant drawbacks.

For one thing, these devices are limited in their use, requiring something to secure them to. As a result, a real estate agent unfamiliar with the location of the spare key security device could spend a substantial amount of time outside the property searching for the device, and often they may be unable to find or access it at all. Furthermore, securing such a device around a door handle, for example, and repeatedly accessing such a device, can result in damage to the door handle or door or to the property otherwise—the last thing a property owner wants when in the process of selling a property.

Thus, there remains a market need for a secure, convenient way to store a spare key outside but local to a property, such as a residence or place of business. And there is a particular need for such a device for use by real estate agents listing properties for sale and requiring access to show the properties to prospective buyers.

SUMMARY OF THE INVENTION

It is accordingly an object of the present invention to provide a device and system for securely and accessibly storing a spare key outside of a property. It is a further object of the present invention to provide the device and system in a convenient, easily locatable and accessible, and aesthetically pleasing manner, considerations that are particularly important when selling real estate.

To accomplish these and other objectives, the present invention provides a lockbox stand with attachable lockbox device with a lockable compartment. The lockbox stand includes a base and a post connected thereto. The base preferably provides a mechanism for extending and collapsing the post such that, when upright, the post extends perpendicular to the ground and to a lateral area of the base and, when collapsed, the post extends parallel to the ground and to a lateral area of the base. This feature provides for convenient storage of the lockbox stand when the post is in the collapsed position and effective use of the lockbox stand to hold a lockbox device easily accessible to a user when the post is in the upright.

Preferable embodiments of the base employ a groove extending from the point of attachment of the post to at least one edge of the base, such groove preferably sized to snugly contain at least a portion of the post when the post is in the collapsed position. In some preferable embodiments, the post may also distend to reduce its length for more convenient storage when in the collapsed position and elongate when in the upright position. In such embodiments, the groove in the base is preferably sized to snugly contain at least a portion of, and more preferably the majority or the entire length of, the post when distended.

Some preferable embodiments of the base further include one or more wheels to assist in moving the lockbox stand into the most convenient position, especially when the post is extended and elongated (in applicable embodiments). Such wheels are preferably located on a single edge of the base, allowing a user to simply tilt the lockbox stand toward the wheel edge to free the remaining edges of the base from contact with the ground and allow the lockbox stand to freely move from location to location without lifting the entire lockbox stand off the ground. Such embodiments improve the convenience of the lockbox stand design, particularly for real estate agents seeking to select the most aesthetically pleasing and convenient location.

Preferable embodiments of the lockbox stand's base also use a retractable cable coiled within the base, the retractable cable being operable to secure the lockbox stand to a property fixture to prevent any unauthorized removal. Such embodiments preferably employ a high-grade cable that is difficult to cut or otherwise tamper with but is still sufficiently malleable to allow it to retract into a coil within the base. Preferable materials for the cable utilize high strength alloys such as galvanized steel or the like.

Such preferable embodiments of the base also include an open space into which the cable can be retracted into a coil for convenient storage and transport. The base preferably includes internal components that help to organize the coiled cable, such as a plurality of protrusions that extend down into the open space from the top surface of the base and extend outward toward the edges of the base, forming an "L" shape. The cable may be coiled around such protrusions when retracted. Preferable embodiments include a cable length of at least 6-10 feet or greater.

Preferable embodiments of the lockbox stand's post include one or more hooks or like extensions. Such extensions provide a location for attaching a lockbox device containing a spare key for entering the associated property, preferably such that the lockbox device cannot be easily removed without knowing the combination to access or remove the lockbox device. For example, a hook can preferably connect to the post on both ends forming a closed loop, which the lockbox device's upper handle can be inserted into for secure attachment, rather than simply hung on an open-ended hook. Such hooks or like extensions are preferably welded onto a back side of the post such that they are not removeable, although removeable attachments such as bolting are likewise possible.

Preferable embodiments of the post also include one or more detachable signs. The signs preferably include common words or phrases, such as "Welcome" or "Welcome Home," and are preferably removably attachable to the post's front side, although a single sign may also be welded thereto as those of ordinary skill in the art will recognize. Some preferable embodiments of the signs may be attachable to the post using a classic nuts-and-bolts arrangement while others may be attached using magnets or other known attachment means. Some preferable embodiments may include several different manners of attachment, which the user can choose and apply based upon the particular circumstances of the lockbox stand's use and convenience.

The signs preferably cover most of the length of the post when the post is in the upright position and fully elongated where applicable. The signs are also preferably wide enough to conceal any lockbox device attached to the back side of the post such that an observer might recognize the lockbox stand only as a welcoming feature of the associated property rather than a manner of storing a spare key. In some embodiments, signs may contain a front and two sides to cover any lockbox device attached to the back side of the post or may contain a front, two sides, and a back to fully encircle such lockbox device. Such embodiments provide for improved concealment of the lockbox device but also make the lockbox device less convenient to access.

Preferable embodiments of the lockbox stand also include a biasing mechanism to encourage the post into the upright position and a latch mechanism to hold the post in the collapsed position. Some preferable embodiments may employ a spring based biasing mechanism while others may employ a pneumatic or hydraulic biasing mechanism, or any combination thereof. The biasing mechanism is preferably incorporated into the lockbox stand's components that attach the post to the base, which preferably also include means for rotateably connecting a lower extension of the post within the interior of the base, the base preferably employing a slot to permit the post's lower extension to pivot relative to a longitudinal axis of the base to permit the post's movement between the upright and collapsed positions.

As those skilled in the art will appreciate, the present invention is not limited to the embodiments and arrangements described above. Other objects of the present invention and its particular features and advantages will become more apparent from consideration of the following drawings and detailed description of the invention.

BRIEF DESCRIPTION OF THE DRAWINGS

FIG. 5 depicts a close-up cross-sectional view from the side of a connection assembly connecting a post and base of a lockbox stand in the collapsed position according to the exemplary embodiments of the present invention depicted in FIGS. 1-4.

FIG. 11A depicts an orthogonal view from above of a lockbox stand in the collapsed position according to the exemplary embodiments of the present invention depicted in FIGS. 9-10.

FIG. 11B depicts an orthogonal view from the side of a lockbox stand in the collapsed position according to the exemplary embodiments of the present invention depicted in FIGS. 9-10 and 11A.

FIG. 19A depicts an exploded perspective view of a base of a lockbox stand according to the exemplary embodiments of the present invention depicted in FIGS. 17-18.

FIG. 19B depicts an orthogonal view from above of a base of a lockbox stand according to the exemplary embodiments of the present invention depicted in FIGS. 17-18 and 19A.

FIG. 19C depicts an orthogonal view from one side of a base of a lockbox stand according to the exemplary embodiments of the present invention depicted in FIGS. 17-18 and 19A-B.

FIG. 19D depicts an orthogonal view from a second side of a base of a lockbox stand according to the exemplary embodiments of the present invention depicted in FIGS. 17-18 and 19A-C.

DETAILED DESCRIPTION OF THE INVENTION

The following detailed description illustrates the technology by way of example, not by way of limitation of the principles of the invention. This description will enable one skilled in the art to make and use the technology, and describes several embodiments, adaptations, variations, alternatives and uses of the invention, including what is presently believed to be the best mode of carrying out the invention. One skilled in the art will recognize alternative variations and arrangements, and the present technology is not limited to those embodiments described hereafter.

Figure 1:
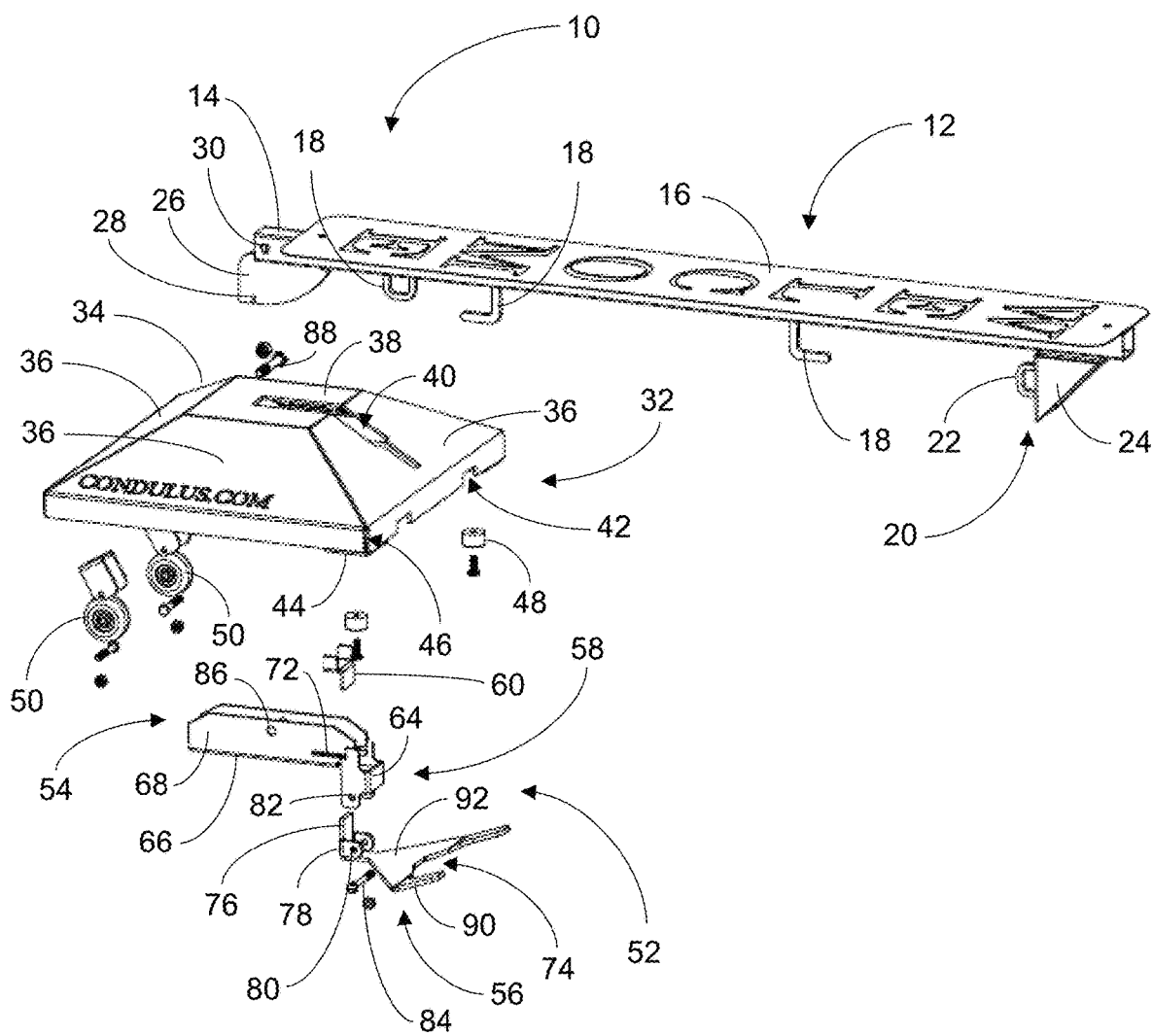
FIG. 1 depicts an exploded perspective view of a lockbox stand according to exemplary embodiments of the present invention.

Referring to FIG. 1, a preferable embodiment of a lockbox stand 10 is provided with a post assembly 12, a base assembly 32, and a connection assembly 52 for connecting the post assembly 12 to the base assembly 22. The post assembly 12 includes a primary post 14 upon which a sign(s) 16 may be mounted. The sign(s) 16 preferably mount to the front-facing side of the primary post 14 so as to present the most pleasingly aesthetic view of the lockbox stand 10 to a user encountering it for the first time. The sign(s) 16 is preferably mountable to the primary post 14 through various means that will be known to those of skill in the art, including through welding, bolt or other mechanical connection, or magnetic connection.

The sign(s) 16 is preferably sized to conceal most if not all of the primary post 14 when the post is extended in the upright position as well as any projections 18 or other items connected to the rear-facing side or elsewhere on the primary post 14. The sign(s) 16 are intended to provide viewers with a pleasant, inviting atmosphere and may have such inviting messages as "Welcome," as depicted in FIG. 1, "Welcome Home," or other messages or presentations, such as a floral arrangement, depictions of a sunny, pleasant day, or the like. The present invention is not limited to any particular depiction on the sign(s) 16 connected to the primary post 14, and several signs 16 may be added or removed as the user sees fit in preferable embodiments.

Some preferable embodiments of the primary post 14 are extendable and retractable to assist in storage and transport of the lockbox stand 10. Various means of extending and retracting the primary post 14 will be known to those of skill in the art, such as a primary post 14 consisting of two or more sections that travel in guides/brackets and/or that collapse within one another and other, similar means. In such preferable embodiments the sign(s) 16 are preferably removable to facilitate the retraction of the primary post 14.

As depicted in FIG. 1, the primary post 14 preferably includes one or more projections 18 on the rear-facing side.

The projections 18 provide for the attachment of secondary items, including a lockbox device. Among the projections 18, preferable embodiments of the lockbox stand 10 include an attachment mechanism 20 for hanging a lockbox device or other key-containing device. As depicted in FIG. 1, the attachment mechanism 20 extends from near the top of the rear-facing side of the primary post 14. The attachment mechanism preferably includes a closed hook 22 that is attached to the primary post 14 and cannot be easily removed, for example because it is welded to the primary post 14 or otherwise permanently attached.

In some preferable embodiments, the closed hook 22 is welded directly to the primary post 14 while, in others, the closed hook 22 is welded to an upper extension 24 creating a surface for attachment of the closed hook 22, as depicted in FIG. 1. Such an arrangement of the attachment mechanism 20 improves the security of any attached lockbox or other key-containing device by eliminating the application of shearing force upon the closed hook 22 when the lockbox stand 10 is in use in the upright position. Those of skill in the art will recognize additional or alternative arrangements for securing a key to the primary post 14 and reducing the likelihood of theft or loss.

Preferable embodiments of the post assembly 12 also employ a lower disk 26 among the projections 18 extending from near the bottom of the rear-facing side of the primary post 14, as depicted in FIG. 1. Lower disk 26 preferably includes a curved edge opposite the edge adjacent to the primary post 14 with at least two positioning slots 28 cut therein. The positioning slots 28 are engageable by components of the connection assembly 52 to hold the rotational positioning of the primary post 14 and associated sign 16 in at least one of two positions: an upright position and a collapsed position. Some preferable embodiments employ a plurality of positioning slots 28 such that the primary post 14 and associated sign 16 can also be locked in a multitude of positional angles between the fully-upright and fully-collapsed positions. A lower peripheral bore 30 is also provided near the bottom edge of the primary post 14 and adjacent to lower disk 26, in some preferable embodiments.

The base assembly 32 includes a housing 34 with one or more attachable feet 48 and one or more wheels 50. The housing is preferably square when viewed from above but may form other polygonal shapes, including a rectangle, hexagon, octagon, etc. The housing 34 is preferably formed by a plurality of side panels 36—four side panels 36 in square and rectangular designs, six side panels 36 in hexagonal designs, eight side panels 36 in octagonal designs, etc.—and a top panel 38 forming a flat surface near the center of the housing 34, as depicted in FIG. 1. An interior of the housing 34 is preferably open to house the connection assembly 52, among other features.

The housing 34 includes an insertion slot 40 sized to accept the post assembly 12 and arranged near the center of the housing 34. As shown in FIG. 1, the insertion slot 40 preferably extends from the approximate center of the housing 34 through the top panel 38 and into a portion of at least one of the side panels 36. The insertion slot 40 is sized and arranged to allow the post assembly 12 to swing up into the upright position and fold back into the collapsed position without detaching the post assembly 12 from the base assembly 32. When the post and base assemblies 12, 32 are connected, the lower disk 26 of preferable embodiments of the post assembly 12 is housed within the interior of the housing 34 such that the lower disk 26 is contactable by the components of the connection assembly 52 to provide for the angular positioning of the primary post 14 and associated sign 16, as described above.

The side panels 36 preferably include an angled upper portion and a lower portion perpendicular to the ground, as depicted in FIG. 1, though the side panels 36 may alternatively consist of a single angular surface as well. At least one side panel 36 of the housing 34 preferably includes one or more slots 42 cut into its bottom edge, as depicted in FIG. 1, to accommodate components of the connection assembly 52. The housing 34 also preferable includes feet-connection surfaces 44 arranged parallel to the ground and located at each of the transition points or corners 46 of the housing 34 where two side panels 36 of the housing meet.

The feet 48 are preferably attachable to the feet-connection surfaces 44 at each corner 46 of the housing 34. Some embodiments include feet 48 attached at each corner 46 of the housing 34 while others may include feet 48 only at certain corners 46. Some preferable embodiments of the base assembly 32 also include one or more wheels 50 to facilitate easy positioning of the lockbox stand 10, especially when the post assembly 12 is in the upright position. The wheels 50 are preferably housed within the housing 34 with a portion extending below the lower edge of the side panels 36 of the housing 34. The wheels 50 preferably extend at least as far below the lower edge of the housing 34 as do the feet 48 and even more preferably the wheels 50 extend at least slightly further below the lower edge of the housing 34.

Preferable embodiments of the connection assembly 52 include a post support assembly 54, a forked base support 56, and a latch sub-assembly 58, including a latch slider 60, and one or more biasing mechanisms 62. In some preferable embodiments, the latch slider 60 may be attached to or part-in-parcel with the forked base support 56 while, in others, it is a separate part, as depicted in FIG. 1. The biasing mechanisms 62 may employ pneumatic, hydraulic, or mechanical biasing means, such as a compressible spring or coil, and are preferably surrounded by a latch shroud 64. The latch shroud 64 also preferably connects the post support assembly 54 with the forked base support 56 when the connection assembly is installed and in use.

Preferable embodiments of the post support assembly 54 include a bottom panel portion 66 and two side panel portions 68 with an open top, forming a U-shaped design when the post support assembly 54 is viewed from the edge. A lengthwise slot 70 cut from a first end of the post support assembly 54 and through a substantial portion of the bottom panel portion 66 permits the passage of the lower disk 26, in preferable embodiments, when adjusting the post assembly 12 between upright and collapsed positions. Likewise, lengthwise slots 72 cut from a first end of the post support assembly 54 and through a substantial portion of the side panel portions 68 permit the translation of the latch slider 60 within the post support assembly 54. Preferable embodiments of the lengthwise slots 72 in the side panel portions 68 extend around ¼ to ½ of the length of the post support assembly 54 and preferable embodiments of the lengthwise slot 70 in the bottom panel portion extend around ⅓ to ⅔ of the length of the post support assembly 54.

The side panel portions 68 of the post support assembly 54 also include central bores 86 preferably located near the upper edge of the side panel portions 68 and substantially centrally along the post support assembly's 54 length. When connection assembly 52 is installed within base assembly 32, the post support assembly 54 is preferably located adjacent to the housing's 34 top panel 38 and just below the insertion slot 40. As such, post support assembly 54 may be connected to post assembly 12 by aligning the central bores 86 of the side panel portions 68 with the lower peripheral bore 30 of the primary post 14, when the primary post's 14 lower portion and lower disk 26, in preferable embodiments, are inserted into the interior of the housing 34 through the insertion slot 40. Connection pin 88 may thus be inserted to rotatably connect the post assembly to the post support assembly 54. Notably, it is important that the primary post 14 can rotate relative to the post support assembly 54 as the post assembly 12 is moved between the upright and collapsed positions, so lower peripheral bore 30 and central bores 86 are each preferably circular and connection pin 88 is preferably cylindrical in shape, though other designs and arrangements are likewise available, as those of skill in the art will recognize.

Preferable embodiments of the forked base support 56 include a substantially horizontal forked portion 74 and a vertical extension portion 76. The vertical extension portion 76 preferably includes a lateral projection 78 extending perpendicularly from each side edge of the vertical extension portion 76, as depicted in FIG. 1, each with a projection bore 80 provided therethrough. The forked base support 56 preferably connects with the latch shroud 64, which is itself connected to the post support assembly 54, by aligning the projection bores 80 of the lateral projections 78 with similarly sized and situated peripheral bores 82 in the latch shroud 64, as depicted in FIG. 1. A pin 84 is inserted through the projection bores 80 and peripheral bores 82 when aligned, thereby connecting the forked base support 56 to the latch shroud 64.

The substantially horizontal forked plate 74, meanwhile, is preferably engaged with the base assembly 32 by aligning and introducing one or more prongs 90 of the forked plate 74 into the one or more slots 42 provided in at least one of the side panels 36 of the base assembly's 32 housing 34. This insertion of prongs 90 into slots 42 precludes lateral displacement of the connection assembly 52 relative to the base assembly 32 while the connection assembly's 52 connection to the post assembly 12 precludes vertical displacement. In some preferable embodiments, the one or more prongs 90 of the forked plate 74 may be provided at an angle relative to the remaining substantially horizontal portion 92, as depicted in FIG. 1. Such preferable embodiments include an angle preferably between 5 and 45 degrees, more preferably between 10 and 30 degrees, and even more preferably around 15 degrees.

Figure 2A:
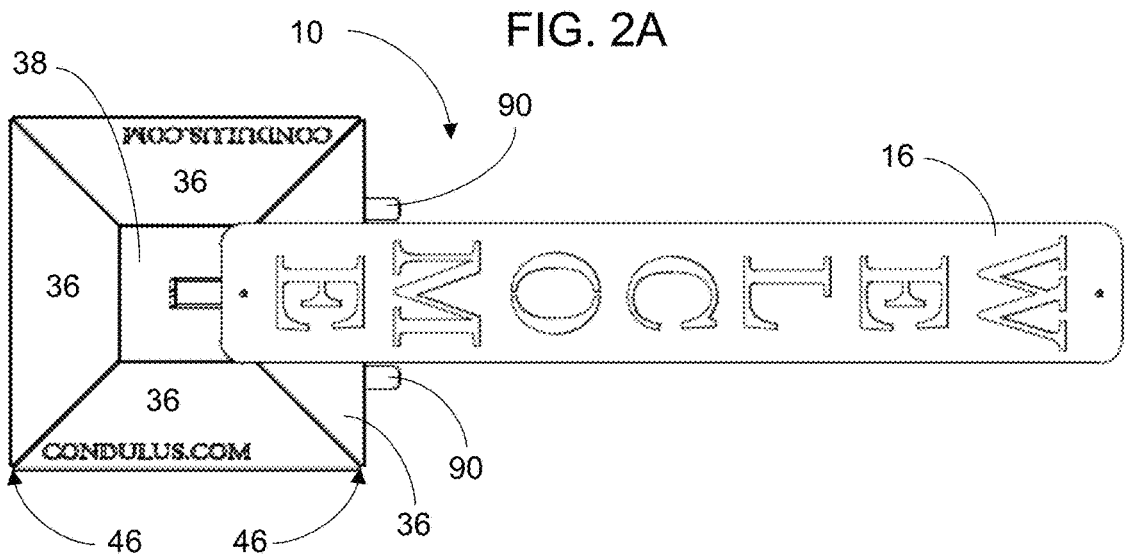
FIG. 2A depicts an orthogonal view from above of a lockbox stand in the collapsed position according to the exemplary embodiments of the present invention depicted in FIG. 1.
Figure 2B:
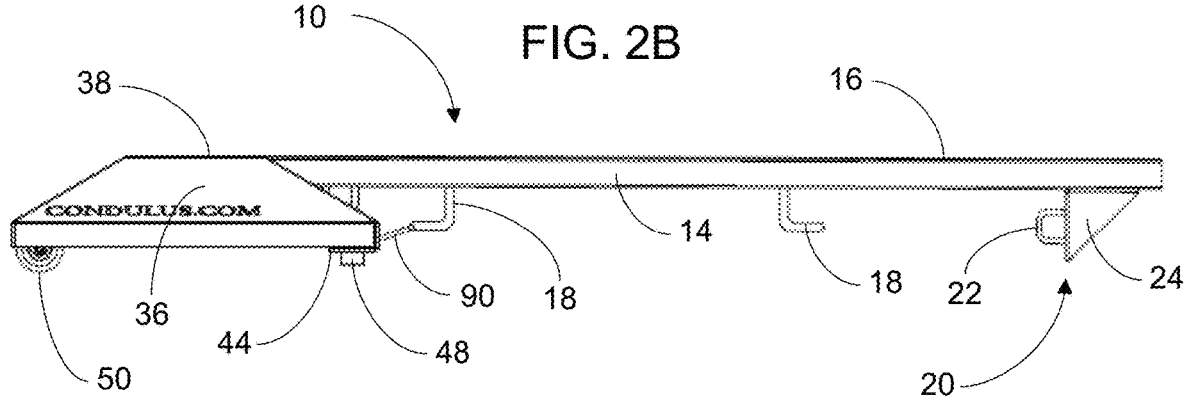
FIG. 2B depicts an orthogonal view from the side of a lockbox stand in the collapsed position according to the exemplary embodiments of the present invention depicted in FIGS. 1-2A.
Figure 2C:
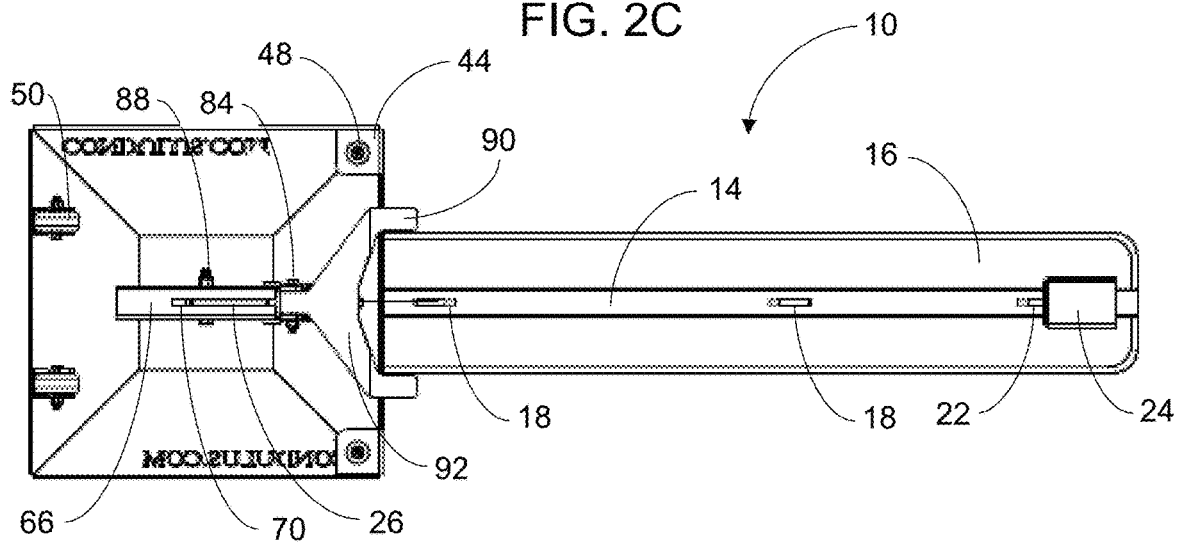
FIG. 2C depicts an orthogonal view from below of a lockbox stand in the collapsed position according to the exemplary embodiments of the present invention depicted in FIGS. 1-2B.

FIGS. 2A-C depict the lockbox stand 10 in the collapsed position, with the post assembly 12 connected to the base assembly 32 via the connection assembly 52. As depicted in FIG. 2A, a view from above, the sign 16 conceals virtually all of the primary post 14 as well as its projections 18 and any key-containing device attached thereto. Notably, the key-containing device(s) are preferably removed from the lockbox stand 10 prior to collapsing the post assembly 12 into the collapsed position. The lower-most portion of the primary post 14 (and lower disk 26 in preferable embodiments) is received within the insertion slot 40 such that the front surface of sign 16 is at an elevation substantially equivalent to the elevation of the base assembly's 32 top panel 38 when in the collapsed position, as depicted in FIG. 2B.

In FIG. 2C, which depicts the lockbox stand 10 in the collapsed position from below, feet-connection surfaces 44, feet 48, wheels 50, and the connection assembly 52 are each visible, with the connection assembly 52 substantially located within the interior of housing 34 and the feet 48 and wheels 50 extending below the lower edge of the housing's 34 side panels 36 to substantially the same elevation, in preferable embodiments. As noted, wheels 50 are preferably partially housed within the interior of the housing 34 as well.

Figure 3A:
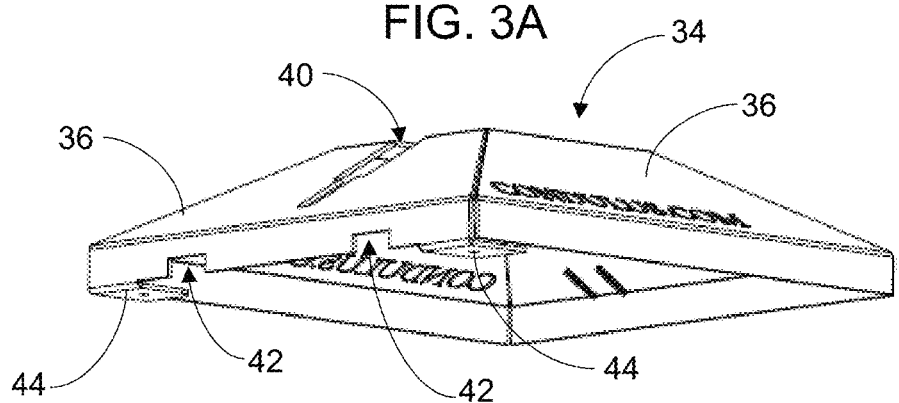
FIG. 3A depicts a perspective view of a base of a lockbox stand according to the exemplary embodiments of the present invention depicted in FIGS. 1-2.

FIGS. 3A-D focus on the base assembly 32 separated from the post assembly 12 and the connection assembly 52. FIG. 3A demonstrates the empty, hollow interior of the housing 34 with the connection assembly 52 and the wheels 50 removed. Also depicted are bottom-edge slots 42 and feet-connection surfaces 44 with the feet 48 removed. In some preferable embodiments, a retractable cable (not depicted) may be wound within the interior of the housing 34. The cable is preferably attached to the base assembly 32 and extend from the base assembly 32 to secure to the property for sale. Such a cable feature is helpful in ensuring the lockbox stand 10 is secured against theft or loss if left at a property without supervision.

Figure 3B:
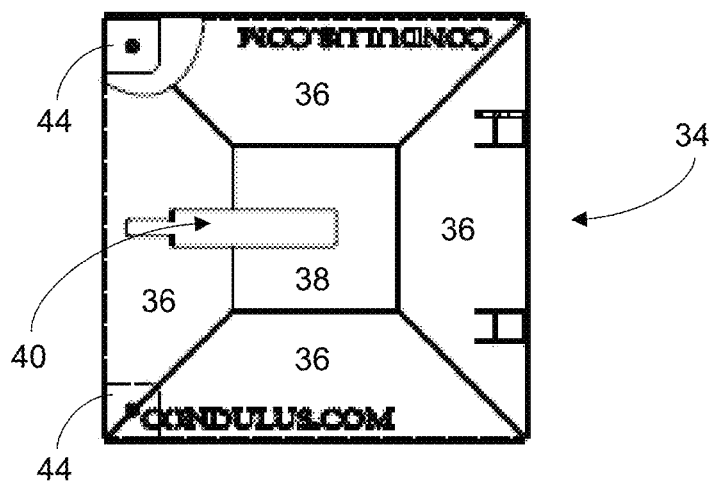
FIG. 3B depicts an orthogonal view from above of a base of a lockbox stand according to the exemplary embodiments of the present invention depicted in FIGS. 1-2 and 3A.
Figures 3C, 3D:
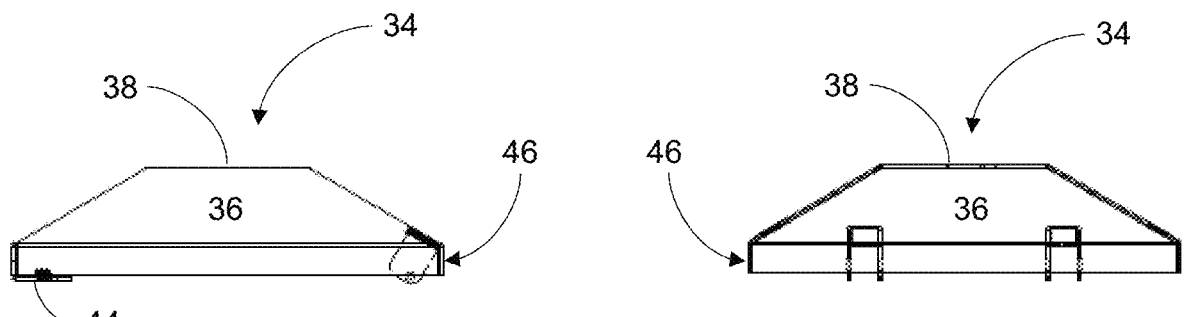
FIG. 3C depicts an orthogonal view from one side of a base of a lockbox stand according to the exemplary embodiments of the present invention depicted in FIGS. 1-2 and 3A-3B.
FIG. 3D depicts an orthogonal view from a second side of a base of a lockbox stand according to the exemplary embodiments of the present invention depicted in FIGS. 1-2 and 3A-3C.

A preferable embodiment of insertion slot 40 is also depicted in FIGS. 3A-B, in which the insertion slot 40 is wider near the center of the housing 34 and employs a more narrow portion extending substantially down the applicable side panel 36. The arrangement allows the primary post 14 to fit within the wider sections of the insertion slot 40 when the lockbox stand 10 is assembled and in the collapsed position, while the narrow portion of the insertion slot 40 is available to receive a projection 18 extending from the rear-facing side of the primary post 14.

In some preferable embodiments, a projection 18 received within the narrow portion of insertion slot 40 may assist in latching or locking the lockbox stand 10 in the collapsed position. In some preferable embodiments, the cable may be extended from the interior of the housing 34 out through the insertion slot 40 when the lockbox stand 10 is in the upright position, although other arrangements or approaches are likewise available, such as extending the cable out from beneath the housing 34 and the like, as will be recognized by those of skill in the art.

Figure 4A:
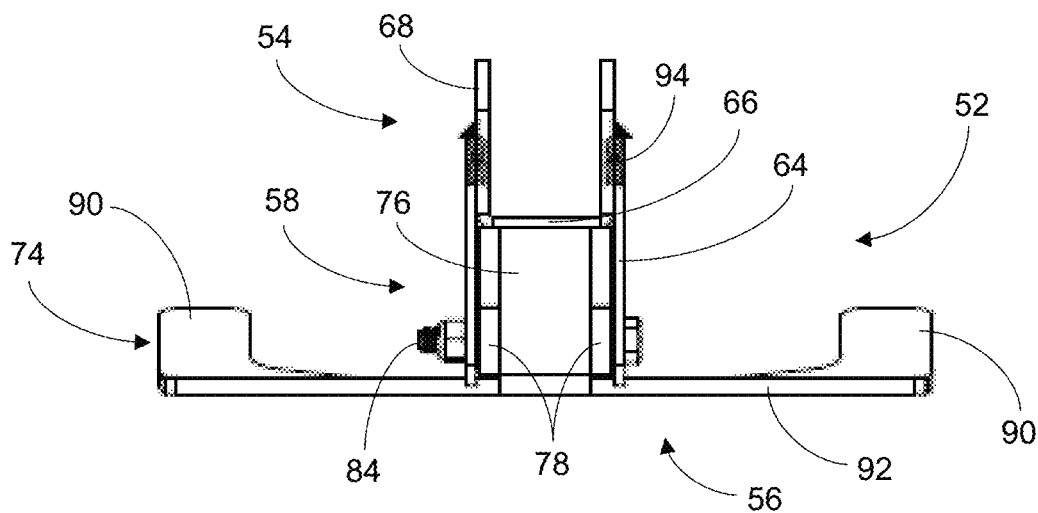
FIG. 4A depicts an orthogonal view from one end of a connection assembly of a lockbox stand according to the exemplary embodiments of the present invention depicted in FIGS. 1-3.
Figure 4B:
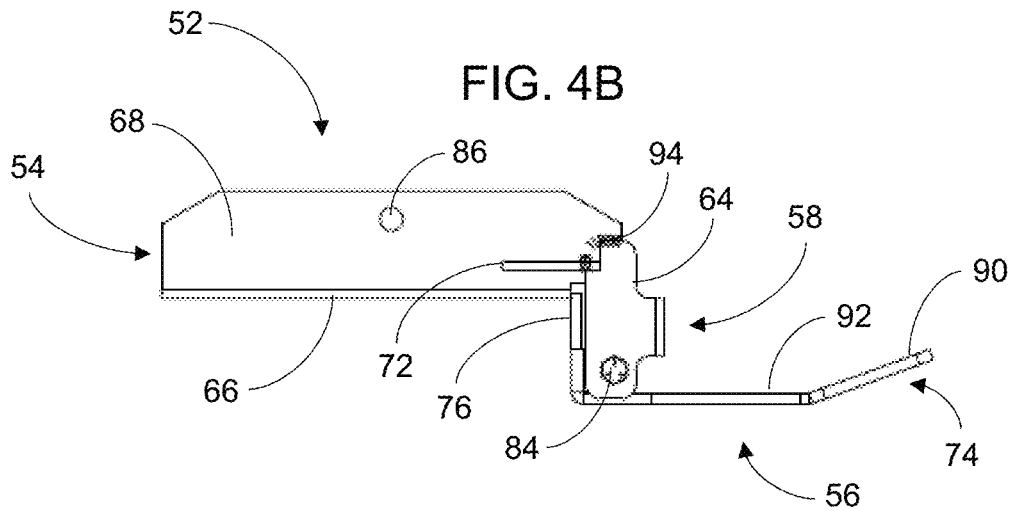
FIG. 4B depicts an orthogonal view from the side of a connection assembly of a lockbox stand according to the exemplary embodiments of the present invention depicted in FIGS. 1-3 and 4A.
Figure 4C:
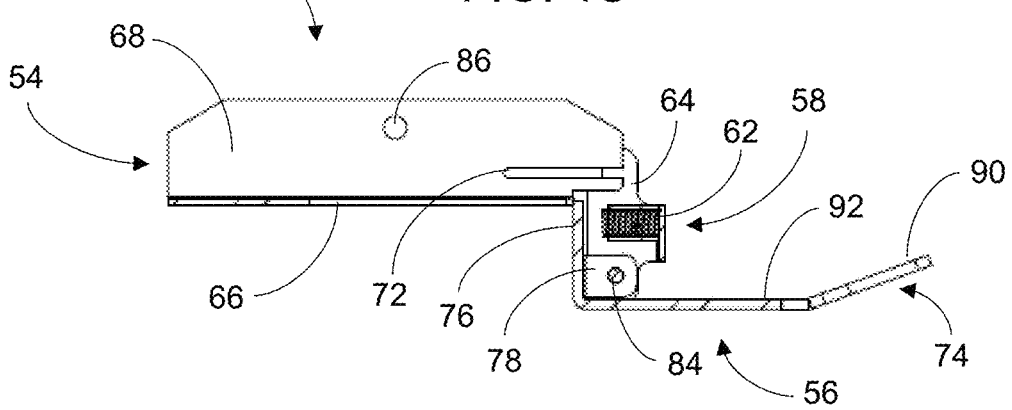
FIG. 4C depicts a cross-sectional view from the side of a connection assembly of a lockbox stand according to the exemplary embodiments of the present invention depicted in FIGS. 1-3 and 4A-4B.

FIGS. 4A-C depict the connection assembly 52 separated from the post assembly 12 and the base assembly 32. FIG. 4A provides a view from a first end of the connection assembly 52. Visible are the U-shaped post support assembly 54 and the forked base support 56 as well as components of the latch sub-assembly 58. Two upper springs 94 are also visible connecting the post support assembly 54 to the latch sub-assembly 58, a feature of some preferable embodiments of the connection assembly 52. As can be seen in FIG. 4A's preferable embodiment, the one or more prongs 90 of the forked plate 74 are provided at an angle relative to the substantially horizontal portion 92.

FIG. 4B provides a side view of the connection assembly 52, in which lengthwise slot 72 and central bore 86 are visible as is the upper spring 94 connecting the post support assembly 54 with the latch shroud 64 of the latch sub-assembly 58. Also visible is the pin 84 connecting the latch shroud 64 of the latch sub-assembly 58 with the forked base support 56, such that the connection assembly 52 is fully assembled and ready for insertion into the interior of the base assembly's 32 housing 34.

FIG. 4C provides a cross-sectional side view of the connection assembly such that the inner components of the latch sub-assembly 58 are viewable. Biasing mechanism 62—in FIG. 4C's preferable embodiment, a mechanical spring—can be seen operable to encourage the latch slider 60 to engage with the post assembly's 12 lower disk 26 in preferable embodiments. Also visible is one of the lateral projections 78 extending perpendicularly from the side edge of the forked base support's 56 vertical extension portion 76, with projection bore 80 provided and arranged to receive pin 84 and connect the forked base support 56 to the latch shroud 64 of the latch sub-assembly 58.

Referring next to FIG. 5, the connection assembly 52 is depicted within the housing 34 of the base assembly 32. The connection assembly 52 depicted in FIG. 5 is in use connecting the post assembly 12 to the base assembly 32, with the lockbox stand 10 in the collapsed position. The primary post 14 of the post assembly 12 is visible in the collapsed position, with the preferable arrangement wherein the front facing side of the primary post 14 is substantially parallel to the top surface of the housing's 34 top panel 38. Sign 16 is visible as well, attached to the front-facing side of the primary post 14 and resting just above the top surface of the housing's 34 top panel 38.

The lower peripheral bore 30 of the primary post 14 is also shown in FIG. 5, which is aligned with the central bores 86 in the post support panel's 54 side panel portions 68 such that connection pin 88 is insertable to connect the post assembly 12 to the connection assembly 52. Also visible is lower disk 26, provided in preferable embodiments of the post assembly 12 to assist in latching the post assembly 12 in the upright and collapsed positions. As depicted, lower disk 26 is preferably provided with at least two positioning slots 28 that are adapted to receive the latch slider 60 of the latch sub-assembly 58, thereby holding the post assembly 12 in place in either the upright or collapsed positions.

As depicted in FIG. 5's preferable embodiment, latch slider 60 is preferably acted upon by one or more biasing mechanisms 62 to bias it toward the lower disk 26 to latch and hold the post assembly in the desired position. Notably, in some preferable embodiments, biasing mechanism 62 may not be necessary, and latch slider 60 may be biased in the appropriate direction through other means, such as simply due to the stiffness and malleability of the metal or other material it is composed of, as will be understood by those of skill in the art.

In the preferable embodiment of the lockbox stand 10 depicted in FIG. 5, latch slider 60 is provided as part-in-parcel to the vertical extension portion 76 of the forked base support 56, though the latch slider 60 may also be a separate, standalone piece in some preferable embodiments. Latch shroud 64 surrounds and contains the latch slider 60 and biasing mechanism 62 in preferable embodiments and connects to the forked base support 56 by aligning the projection bores 80 in the vertical extension portion's 76 lateral projections 78 with the latch shroud's 64 peripheral bores 82 and inserting pin 84 (not depicted in FIG. 5). Note that, in some preferable embodiments, projections 18 attached to the rear-facing side of primary post 14 may also play a role in the latching operation, as those of skill in the art will recognize.

Figure 6A:
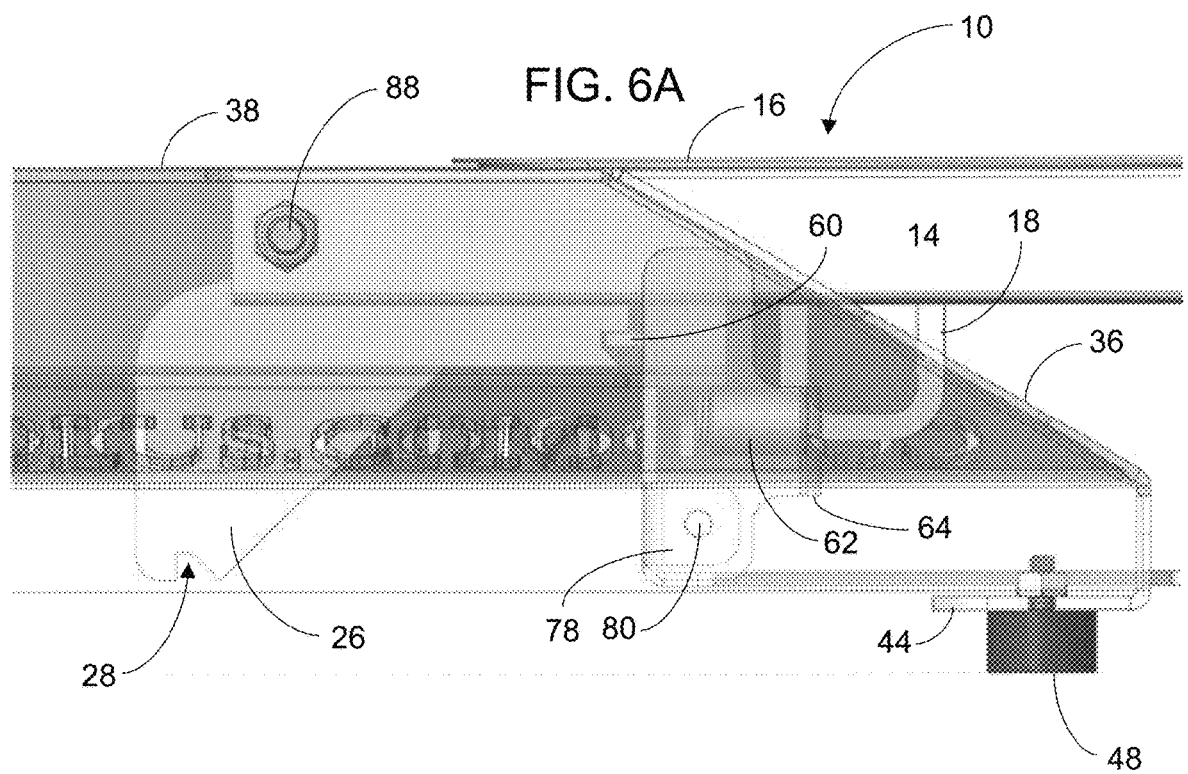
FIG. 6A depicts a close-up cross-sectional view from the side of a connection assembly connecting a post and base of a lockbox stand in the collapsed position according to the exemplary embodiments of the present invention depicted in FIGS. 1-5.
Figure 6B:
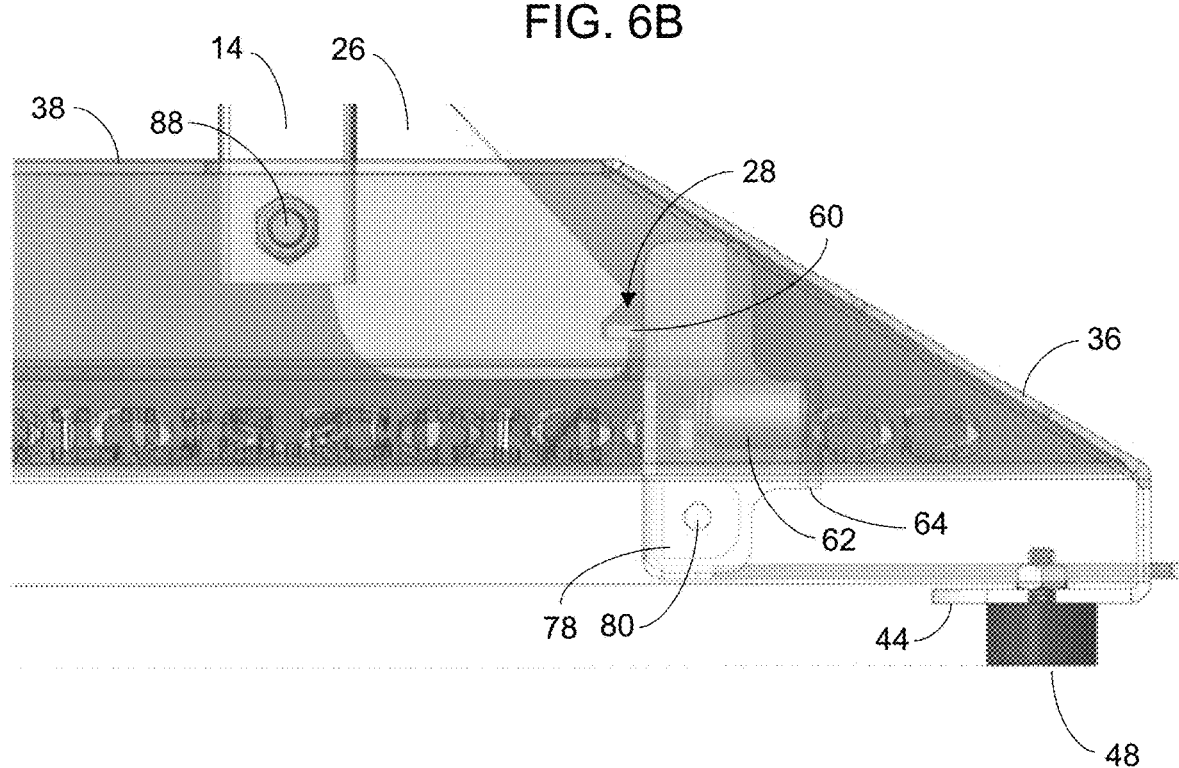
FIG. 6B depicts a close-up cross-sectional view from the side of a connection assembly connecting a post and base of a lockbox stand in the upright position according to the exemplary embodiments of the present invention depicted in FIGS. 1-5 and 6A.

FIGS. 6A-B show the connection assembly 52 in use attaching the post assembly 12 to the base assembly 32, with FIG. 6A depicting the lockbox stand 10 in the collapsed position and FIG. 6B depicting the lockbox stand 10 in the upright position. FIGS. 6A-B show the progression of the lower disk 26 when moving the post assembly 12 between the collapsed and upright positions. As depicted, a first positioning slot 28 located in a top edge of the lower disk 26 is engaged by the latch slider 60 when the post assembly 12 is in the collapsed position (FIG. 6A) while a second positioning slot 28 located near a bottom edge of the lower disk 26 is engaged by the latch slider 60 in the upright position. As noted, some preferable embodiments of the lower disk 26 include additional positioning slots between the two depicted in FIGS. 6A-B, providing additional flexibility in positioning the post assembly 12 if the lockbox stand 10 is located on an uneven surface or the user desires an intermediate position for some other reason.

Figure 7:
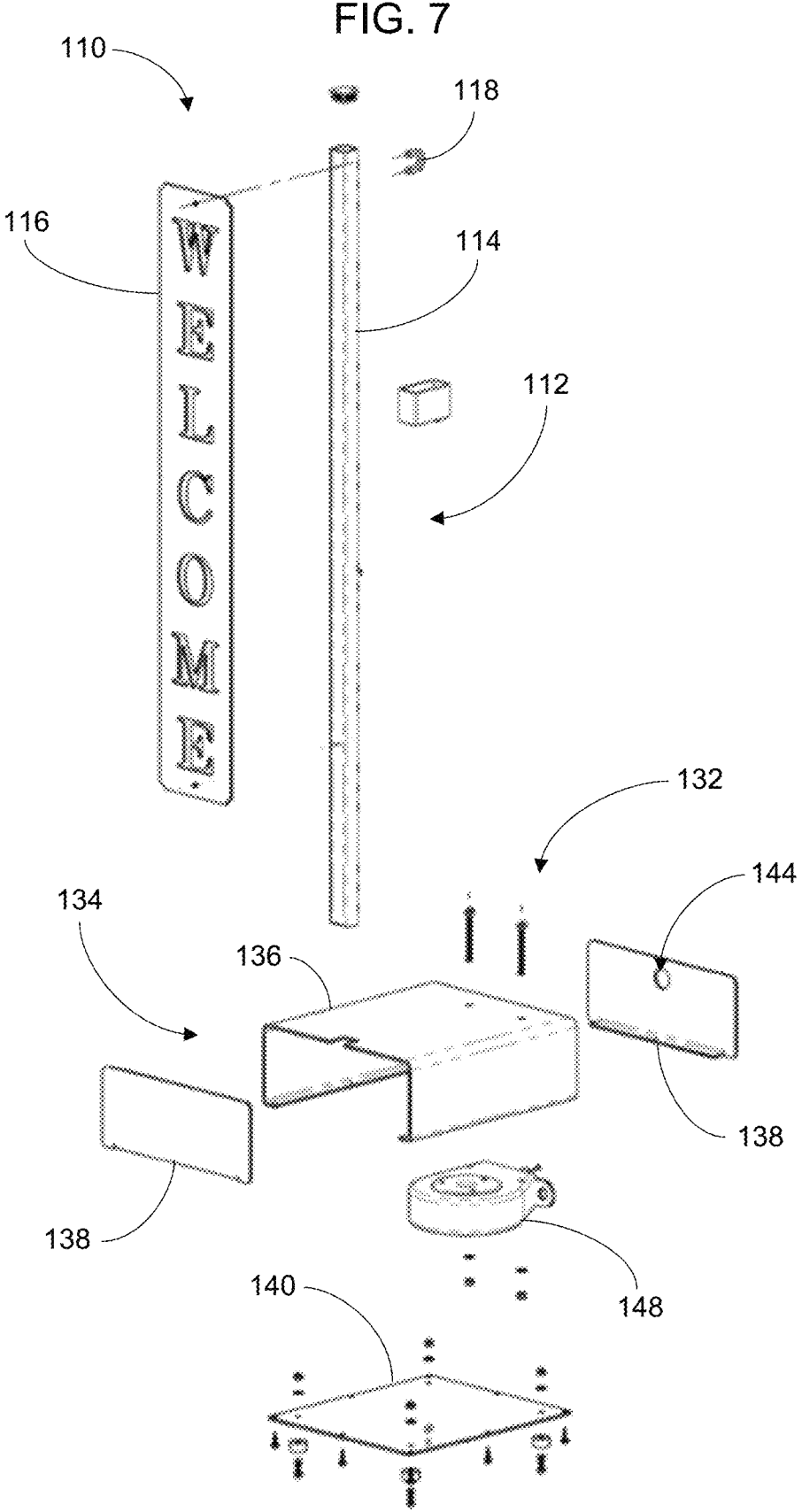
FIG. 7 depicts an exploded perspective view of a lockbox stand according to exemplary embodiments of the present invention.

Referring now to FIG. 7, a preferable embodiment of a lockbox stand 110 is depicted, the lockbox stand 110 employing a post assembly 112 and a base assembly 132. The post assembly 112 employs a primary post 114 and one or more signs 116 attachable to the front-facing side of the primary post 114. The sign 116 depicted in FIG. 7 uses the inviting message "Welcome," although other messages and depictions are likewise available, as discussed above. The sign 116 is preferably removably attachable to the primary post 114 via magnets, screws, bolts, or other known removeable connection methods, but may also be welded or otherwise attached in a non-removeable manner. The sign 116 is preferably sized and shaped to conceal most if not all of the primary post 114 as well as the projections 118 and any device attached thereto.

The post assembly 112 preferably employs one or more projections 118 arranged on the rear-facing side of the primary post 114. Such projections 118 are useable to attach a key-containing device, such as the lockbox device typically attached by real-estate brokers to a doorknob or elsewhere on the outside of a property for sale. As depicted in FIG. 7, at least one of the projections 118 is preferably a closed loop to reduce the possibility of theft or loss of any attached key-containing device. Such closed-loop projections 118 are also preferably attached to the primary post 114 in a non-removeable manner, such as by welding, although other methods of securing the key-containing device will be recognized by those of skill in the art, such as a lockably removeable closed-loop projection 118 or the like.

FIG. 7 also depicts the base assembly 132, which employs a housing 134 with a primary panel 136, one or more end panels 138, and a bottom panel 140 in preferable embodiments. Some preferable embodiments may have only a single separated end panel 138 or bottom panel 140 or the like. The primary panel 136 includes an insertion slot 142 sized and arranged to receive the lower portion of the primary post 114 when the lockbox stand 110 is upright and fully assembled. At least one of the primary panel 136, one or more end panels 138, and a bottom panel 140 preferably includes at least one aperture 144. Said aperture 144 is preferably sized to slidably receive a standard size cable 146, which is usable to attach the lockbox stand 110 to the property to prevent theft or loss when the lockbox stand 110 is left without supervision. Said cable 146 is preferably attached to the housing 134 and can be wound within the hollow interior of the housing 134 when not in use.

The base assembly 132 also preferably includes one or more wheels 148 that are preferably stowable within the hollow interior of the housing 134 (alongside the cable 146 in some preferable embodiments) and can be easily extracted for use. In some preferable embodiments, for example, the one or more wheels 148 may be connected to the primary panel 136 and may be extracted for use by removing or swinging open one of the end panels 138 and then stowed within the housing 134 when no longer needed. Other available arrangements will be apparent to those of ordinary skill in the art, and the present invention is not limited to any one particular embodiment or arrangement.

Figure 8A:
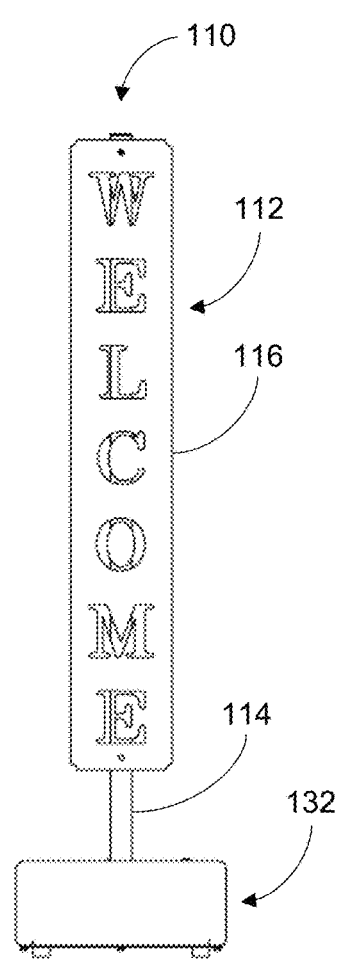
FIG. 8A depicts an orthogonal view from the front of a lockbox stand in the upright position according to the exemplary embodiments of the present invention depicted in FIG. 7.
Figure 8B:
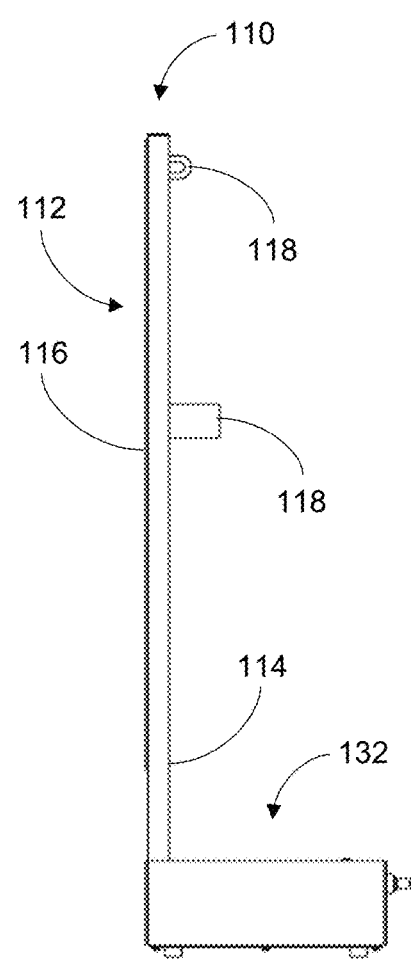
FIG. 8B depicts an orthogonal view from the side of a lockbox stand in the upright position according to the exemplary embodiments of the present invention depicted in FIGS. 7 and 8A.
Figure 8C:
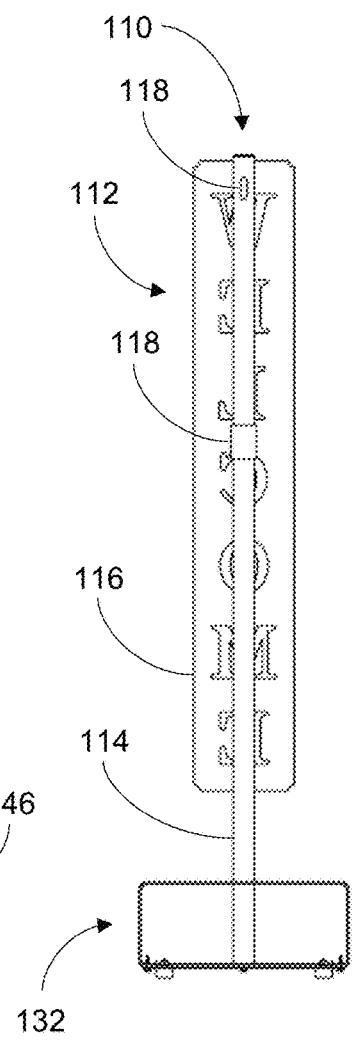
FIG. 8C depicts a cross-sectional view from the back of a lockbox stand in the upright position according to the exemplary embodiments of the present invention depicted in FIGS. 7 and 8A-8B.

Referring next to FIGS. 8A-C, views of the lockbox stand 110 in use are depicted from the front, side, and back, respectively. As depicted in FIG. 8A, the sign 116 preferably extends along most of the length of the primary post 114 covering its front-facing side, any projections 118 extending from its rear-facing side, and any lockbox device or other items attached thereto. FIG. 8B depicts a small portion of the cable 146 extending out through the aperture 144, in this case located on the rear-facing end panel 138. The remainder of the cable 146 is coiled within the interior of the housing 134 in the embodiment depicted in FIG. 8B but may be slidably extended out to secure the lockbox stand 110 to the property. Preferable embodiments also employ means within the interior of the housing 134, such as internal projections, for example, to guide the coiling of the cable 146 and avoid tangling, knotting, and the like.

Figure 9:
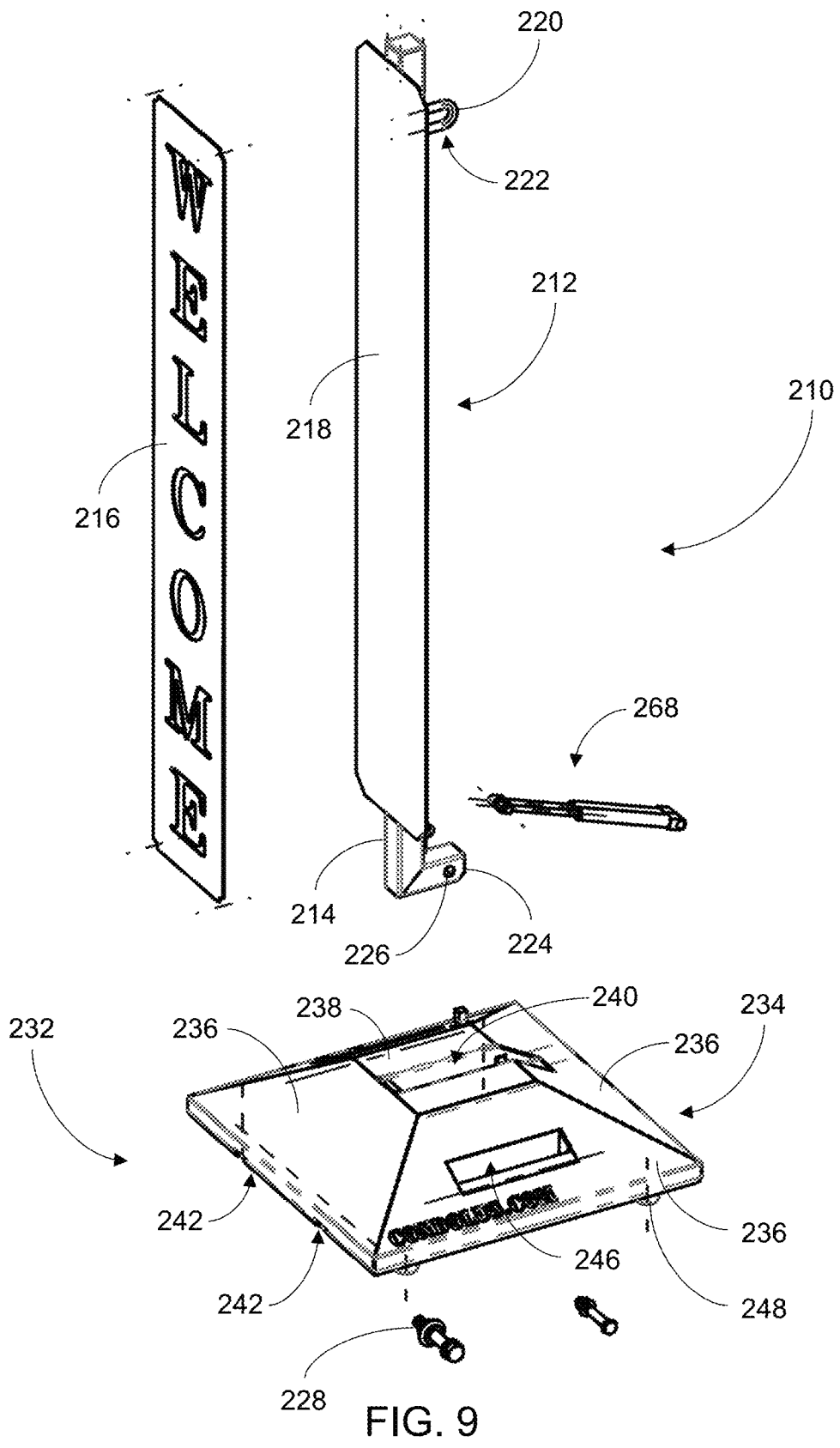
FIG. 9 depicts an exploded perspective view of a lockbox stand according to exemplary embodiments of the present invention.

FIG. 9 depicts another preferable embodiment of the present lockbox stand 210 invention. The lockbox stand 210 employs post assembly 212, base assembly 232, and connection assembly 252. Post assembly 212 includes primary post 214 and one or more signs 216 attachable to the front-facing side thereof. The sign(s) preferably includes an inviting message and is preferably sized to cover substantially all of the front-facing side of the primary post 214. As depicted in FIG. 9, some preferable embodiments of post assembly 212 include a sign-attachment surface 218 upon which the signs 216 are mounted. Such embodiments facilitate changing out signs 216 with different messages or depictions quickly and easily. The signs 216 are preferably removeably attachable using means such magnets or bolts, but may alternatively be attached permanently, such as by welding or the like, in some embodiments.

Preferable embodiments of the post assembly 212 also include one or more projections 220 attached to the rear-facing side of the primary post 214, from which a user can attach key-containing devices, such as the classic lockbox device typically attached by real-estate brokers to a property's door handle or the like. Such projections 220 are preferably permanently attached or lockable to the rear-facing side of the primary post 214 to prevent theft or loss of an attached key-containing device. Preferable embodiments include at least one closed hook 222 amongst the projections 220, the closed hook 222 providing a secure place to attach a key-containing device without a significant risk of theft or loss of the key-containing device Preferable embodiments of primary post 214 further include a lateral extension portion 224 at the primary post's 214 lower end. The lateral extension 224 facilitates attachment of the post assembly 212 with the base assembly 232 via the connection assembly 252. The lateral extension 224 preferably includes a lateral bore 226 through which a pin 228 can be inserted to rotatably connect the post assembly 212 to the connection assembly 252. As depicted in FIG. 9, the primary post 214 and lateral extension portion 224 are preferably sized and arranged to be insertable into the base assembly 232 to connect to the connection assembly 252 installed within the interior of the base assembly 232.

Figure 13:
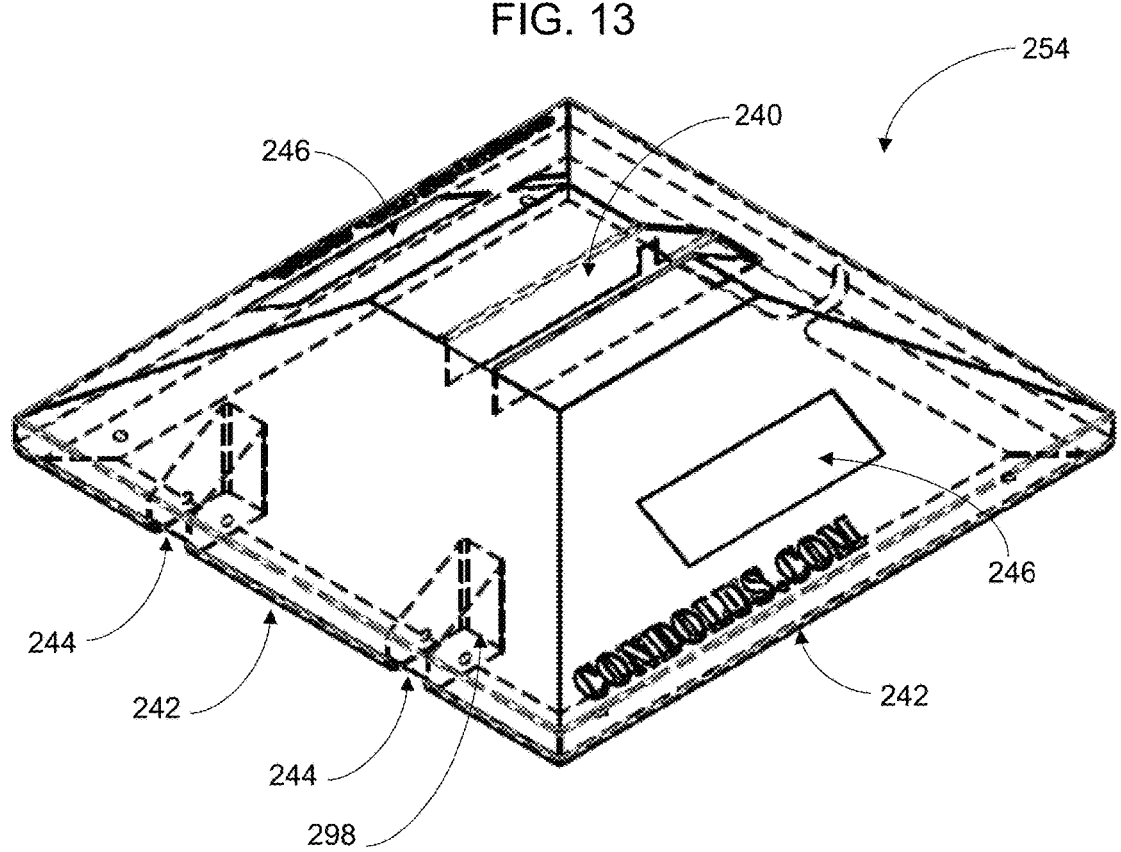
FIG. 13 depicts a transparent perspective view of a base of a lockbox stand according to the exemplary embodiments of the present invention depicted in FIGS. 9-12

The base assembly 232 includes a housing 234 formed by a top panel 238 and a plurality of side panels 236. The interior of the housing 234 is preferably open, as shown in FIG. 13, and houses the connection assembly 252 among other features. Preferable embodiments of the housing 234 form a rectangle or a square or other regular polygonal shape. An insertion slot 240 is preferably arranged in the top panel 238 and at least a portion of at least one of the plurality of side panels 236, the insertion slot 240 permitting the insertion of the primary post's 214 lower end and lateral extension 224. The primary post's 214 lower end and lateral extension 224 thus reside within the interior of the housing 234 when the lockbox stand 210 is assembled for use.

Preferable embodiments of side panels 236 include flanges 242 extending inwardly from each side panel's 236 bottom edge. Such flanges 242 form a sectional bottom panel of the housing 234 upon which one or more feet 248 may be mounted. The feet 248 are preferably adjustable in height to assist the use of the lockbox stand 210 when placed on an uneven surface. The feet 248 are preferably located near each corner of the housing 234 but may be included only in some corners or may be otherwise located, as will be recognized by those of skill in the art. Preferable embodiments of the base assembly 232 also include one or more handle openings 246 located in one or more side panels 236 to assist the lifting and transport of the lockbox stand 210, as depicted in FIG. 9.

Figure 10A:
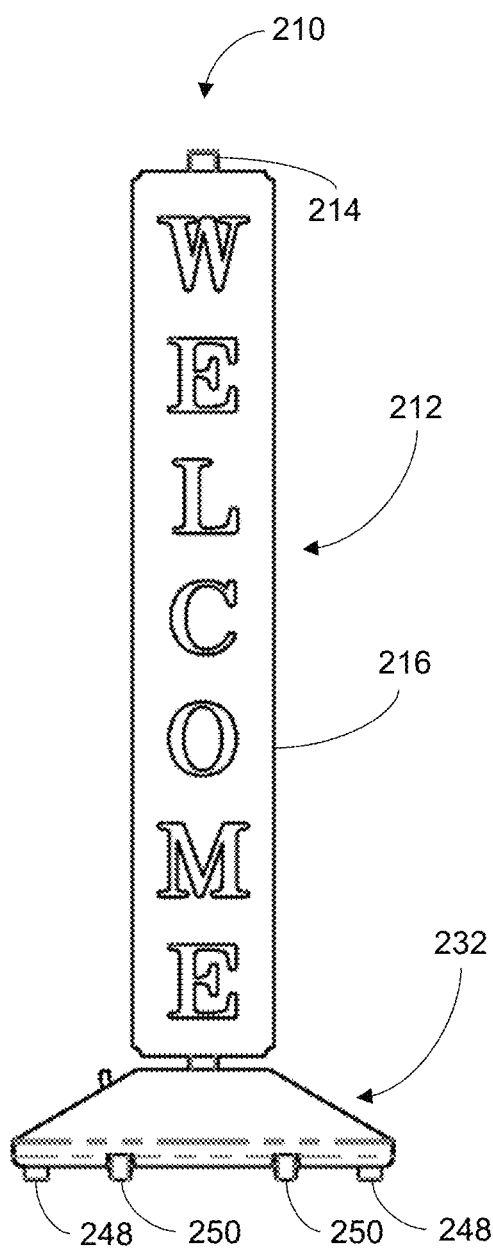
FIG. 10A depicts an orthogonal view from the front of a lockbox stand in the upright position according to the exemplary embodiments of the present invention depicted in FIG. 9.
Figure 10B:
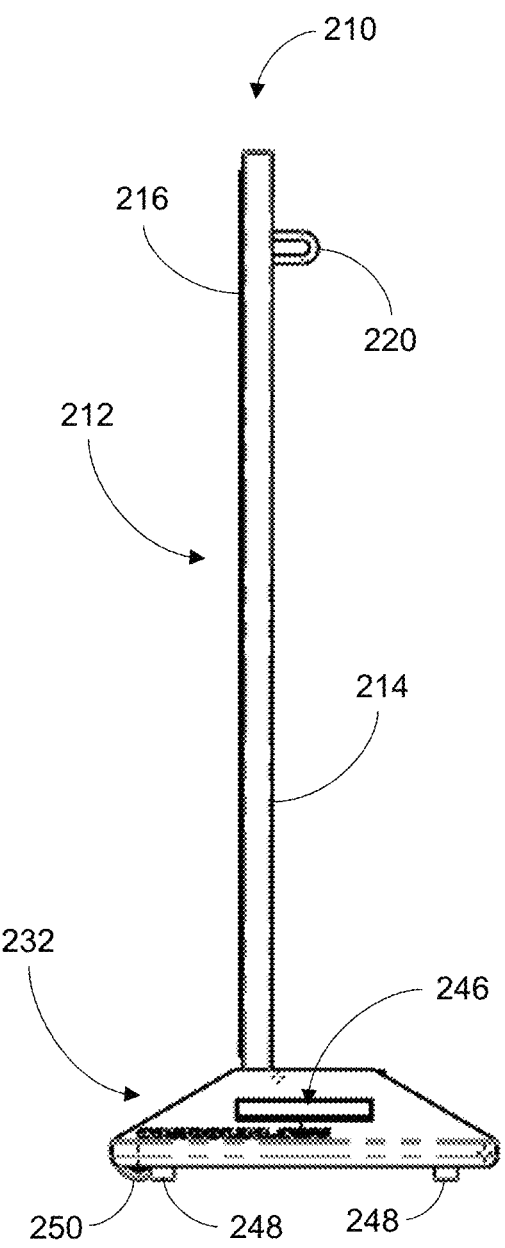
FIG. 10B depicts an orthogonal view from the side of a lockbox stand in the upright position according to the exemplary embodiments of the present invention depicted in FIGS. 9 and 10A.

Referring now to FIGS. 10A-B, lockbox stand 210 is depicted in an assembled and upright position, with post assembly 212 inserted within and connected to base assembly 232 via connection assembly 252. As depicted in FIGS. 10A-B, preferable embodiments of base assembly 232 include one or more wheels 250 mounted upon at least one of the plurality of side panels 236. The wheels 250 are preferably housed primarily within the housing 234 and may be extended downwardly to facilitate their use, in some embodiments, or may be permanently located such that they are engageable by leaning the lockbox stand 210 to one side until they reach the ground, in some embodiments. Wheels 250 may be mounted upon a single side panel 236, upon each side panel 236, or upon any number of side panels 236 to assist in relocating the lockbox stand 210 once assembled and placed in the upright position.

Preferable embodiments of the side panels 236 may include one or more wheel apertures 244 cut into the lower edge of the side panels 236 and through any associated flange 242, in embodiments including flanges 242. Such wheel apertures 244 provide space for wheels 250 to freely rotate and help to prevent the housing 234 from contacting the ground when a user is relocating the lockbox stand 210 after assembly. And feet 248 preferably extend down from the lower edge of the housing 234 to approximately the same height as do the wheels 250 or a slightly below the height of the wheels 250 to provide for the stable placement of the lockbox stand 210 once assembled.

FIGS. 11A-B show the lockbox stand 210 assembled and in the collapsed position, with the post assembly 212 lying flat and substantially parallel relative to the top panel 238 of the housing 234. As opposed to the situation depicted in FIGS. 10A-B, wherein the assembled lockbox stand 210 is in the upright position. Preferable embodiments of the lockbox stand 210 permit the post assembly 214 to rotate relative to the base assembly 232 such that adjusting the lockbox stand 210 between the upright and collapsed positions is quick and easy. The features of the preferably embodiments of the connection assembly 252 make this functionality possible.

Figure 12:
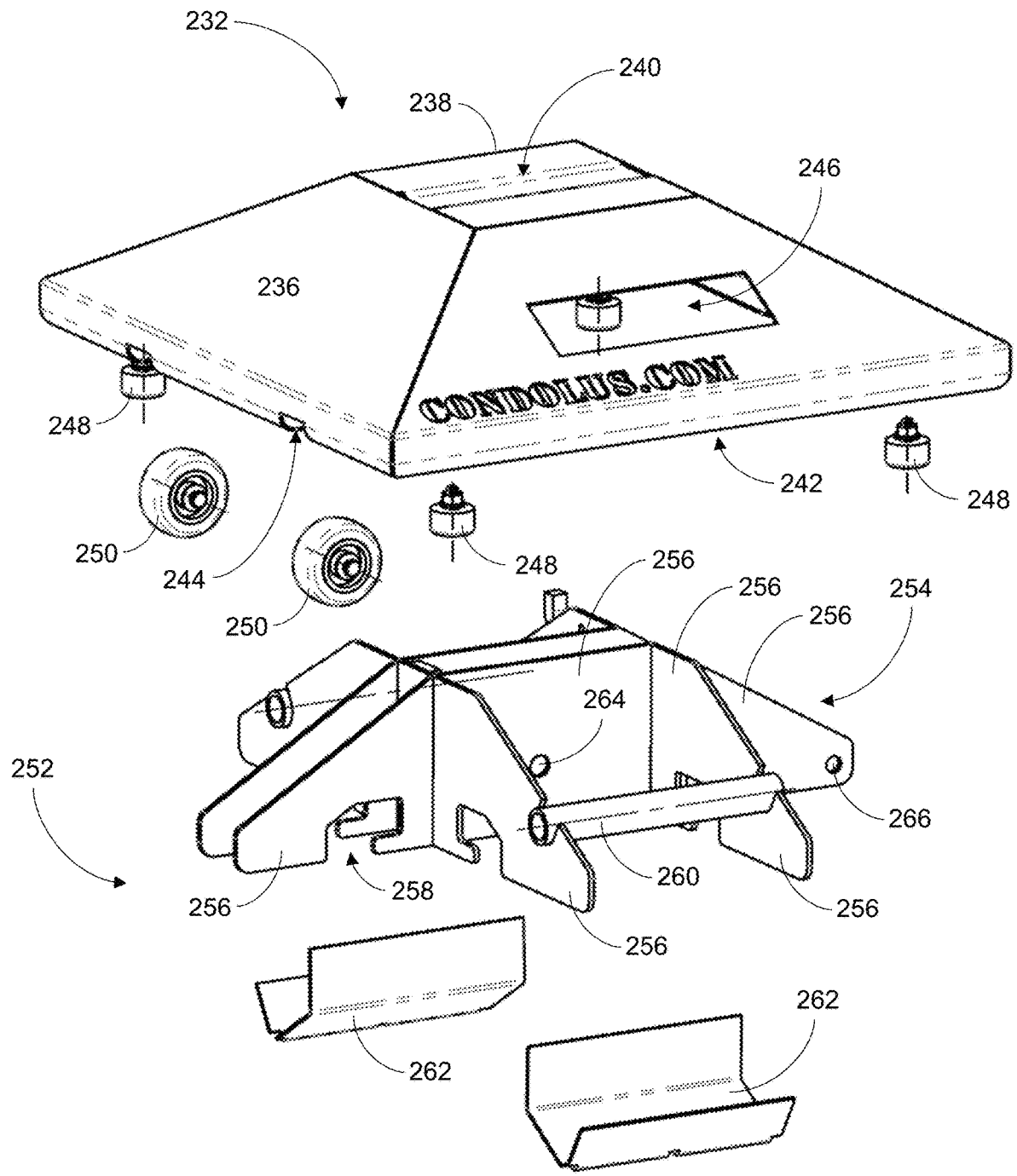
FIG. 12 depicts an exploded perspective view of a base of a lockbox stand according to the exemplary embodiments of the present invention depicted in FIGS. 9-11.

Referring to FIG. 12, the lockbox stand's 210 base assembly 232 and connection assembly 252 can be seen disassembled and in an exploded view. The connection assembly 252 includes an internal frame 254 sized and arranged to fit within the interior of the base assembly's 232 housing 234. The internal frame 254 is preferably composed of several frame plates 256 that interconnect to form a shape substantially matching the shape of the housing 234, as depicted in FIG. 12. In the preferable embodiment depicted in FIG. 12, the internal frame is composed of four interconnected frame plates 256, although the number of frame plates 256 included in the internal frame 254 may vary, as will be understood by those of skill in the art.

In preferable embodiments, each frame plate 256 includes an L-shaped aperture 258 creating a series of openings through which a retractable cable (not depicted) may be coiled when retracted within the housing 234. Such cable is useful for attaching the lockbox stand 210 to the property to prevent theft or loss when left unattended, and preferable embodiments of the lockbox stand 210 employ means for extracting the cable from the housing when needed and retracting the cable to the coiled state within the housing when no longer needed.

Preferable embodiments of the connection assembly 252 also employ one or more handles 260 accessible to the user through the handle openings 246 in the side panels 236 of the housing 234. Some preferable embodiments further include handle shrouds 262, which preferably attach to the inner surface of the housing's 234 side panels 236 and surround the handles 260, thereby preventing a user seeking to access the handles 260 from inadvertently contacting the other features within the housing 234.

Preferable embodiments of the internal frame 254 also include a central bore 264, which lines up with lateral bore 226 when each of the post assembly 212, base assembly 232, and connection assembly 252 are inter-connected and assembled. In such preferable embodiments, pin 228 passes through the central bore 264 in the internal frame 254 and through the lateral bore 226 in the primary post's 214 lateral extension 224 to rotatably connect the post assembly 212 to the connection assembly 252. Likewise, the internal frame 254 is connect-ably housed within housing 234, with the primary post 214 also inserted within housing 234 through insertion slot 240, thereby inter-connecting all of the post assembly 212, base assembly 232, and connection assembly 252 simultaneously for use. Preferable embodiments of the internal frame 254 further include at least one peripheral bore 266 located near the edge of the internal frame and near at least one of the side panels 236 when the connection assembly 252 is installed within the base assembly 232.

Referring now to FIG. 13, a transparent depiction of the housing 234 of the base assembly 232 is provided. Visible are the housing's 234 side panels 236—four in this embodiment—top panel 238 with insertion slot 240, flanges 242 forming the sectional bottom panel of the housing 234, handle openings 246, and wheel apertures 244 as well as wheel housings 298, which are also included in some preferable embodiments of the base assembly 232. FIG. 13 is depicted without the presence of the connection assembly 252, but the open interior of the housing 234 is visible, which is preferably sized and designed to snugly fit the connection assembly 252 to prevent any unwanted movement or shifting of the connection assembly 252 when the lockbox stand 210 is assembled and in use.

Figure 14:
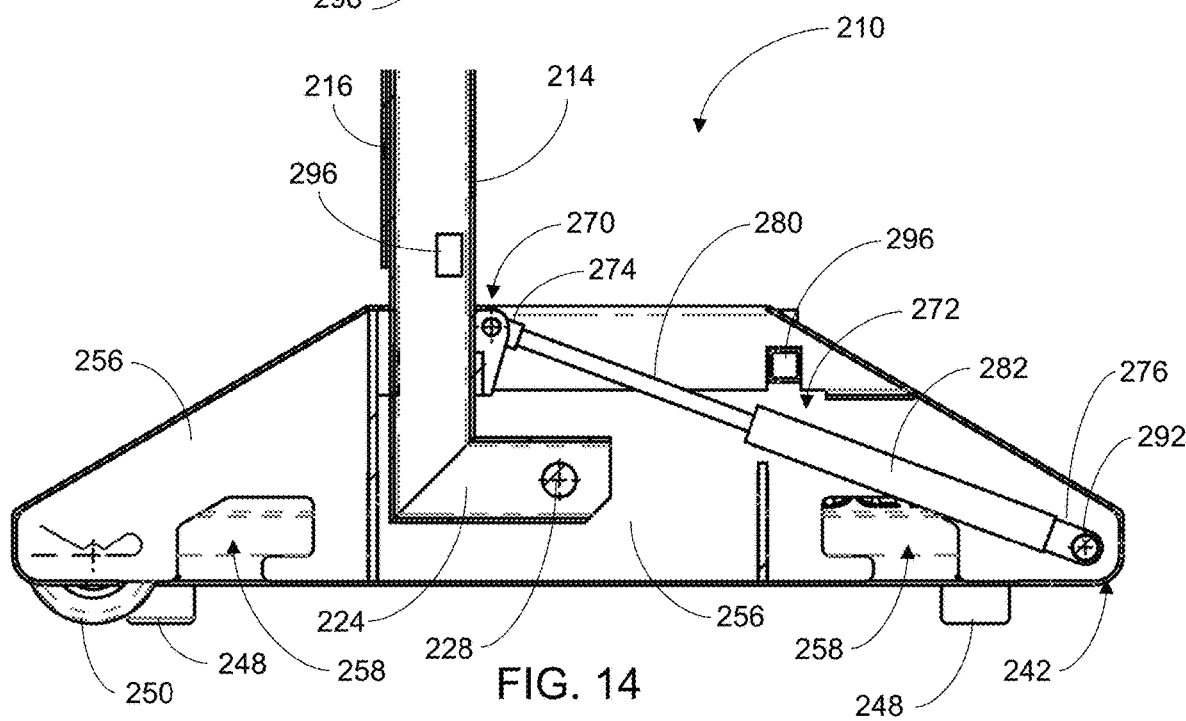
FIG. 14 depicts a close-up cross-sectional view from the side of a connection assembly connecting a post and base of a lockbox stand in the upright position according to the exemplary embodiments of the present invention depicted in FIGS. 9-13.

Referring next to FIG. 14, a cross sectional view is shown of a preferable embodiment of the lockbox stand 210 assembled and in the upright position, including a partial view of the post assembly 212 and cross-sectional views of features of the base assembly 232 and connection assembly 252. Visible is an outline of the base assembly's 232 housing 234 and portions of its feet 248 and wheels 250. Also visible is the post assembly's 212 primary post 214 and lateral extension portion 224, which are inserted into the interior of the housing 234 through the insertion slot 240 and rotatably attached to the connection assembly 252 in a first instance via pin 228 inserted into the lateral extension's 224 lateral bore 226 and through the internal frame's 254 central bore 264, which is aligned with the lateral bore 226 when the lockbox stand 210 is assembled.

Figure 15:
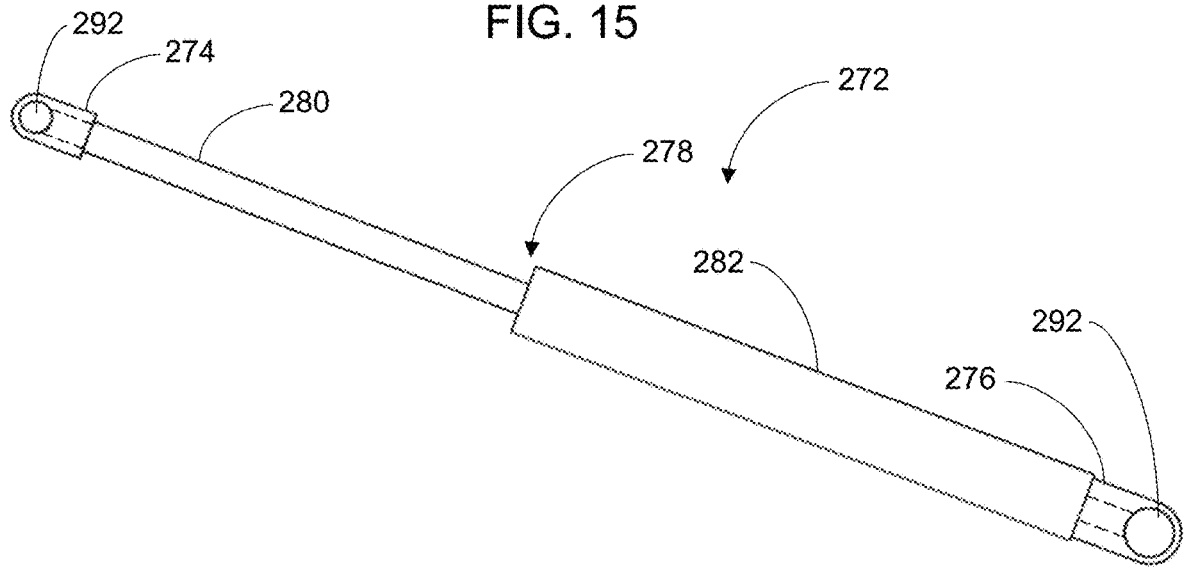
FIG. 15 depicts an orthogonal view from the side of a lift strut assembly of a connecting assembly of a lockbox stand according to the exemplary embodiments of the present invention depicted in FIGS. 9-14.

Also attaching the post assembly 212 and connection assembly 252 in preferable embodiments is a lift assembly 268 comprising a lift strut 272 and a lift strut mount 270. The lift strut 272, a preferable embodiment of which is depicted in FIG. 15, includes an upper lift strut fitting 274 and a lower lift strut fitting 276, each with a lateral bore 292 extending therethrough, and a translational strut portion 278 extending therebetween. The lift strut 272 attaches to the internal frame 254 via a pin inserted through the lower lift strut fitting's 276 lateral bore 292 and the peripheral bore 266 in the internal frame 254. The upper lift strut fitting 274 likewise attaches to the lift strut mount 270, which is itself mounted to the post assembly's 212 primary post 214, as depicted in FIG. 14.

The translational strut portion 278 of the lift strut 272 preferably includes means to bias the lift strut 272 into a fully-extended position, which encourages the post assembly 212 into the upright position when the lockbox stand 210 is assembled. Such means may include pneumatic, hydraulic, or mechanical means, such as an internal spring (not depicted). Such means encourage an upper portion 280 of the translational strut 278 adjacent to the upper lift strut fitting 274 away from a lower portion 282 of the translational strut 278 adjacent to the lower lift strut fitting 276, with such encouragement or pressure increasing as the translational strut portion 278 is compressed and the upper portion 280 slideably enters the lower portion 282, as is the case when the post assembly 212 is folded down into the collapsed position. The upper portion 280 and lower portion 282 of the translational strut are sized and engaged such that the upper portion 280 can slide freely within the lower portion 282 as the post assembly 212 is raised and lowered.

Figure 16:
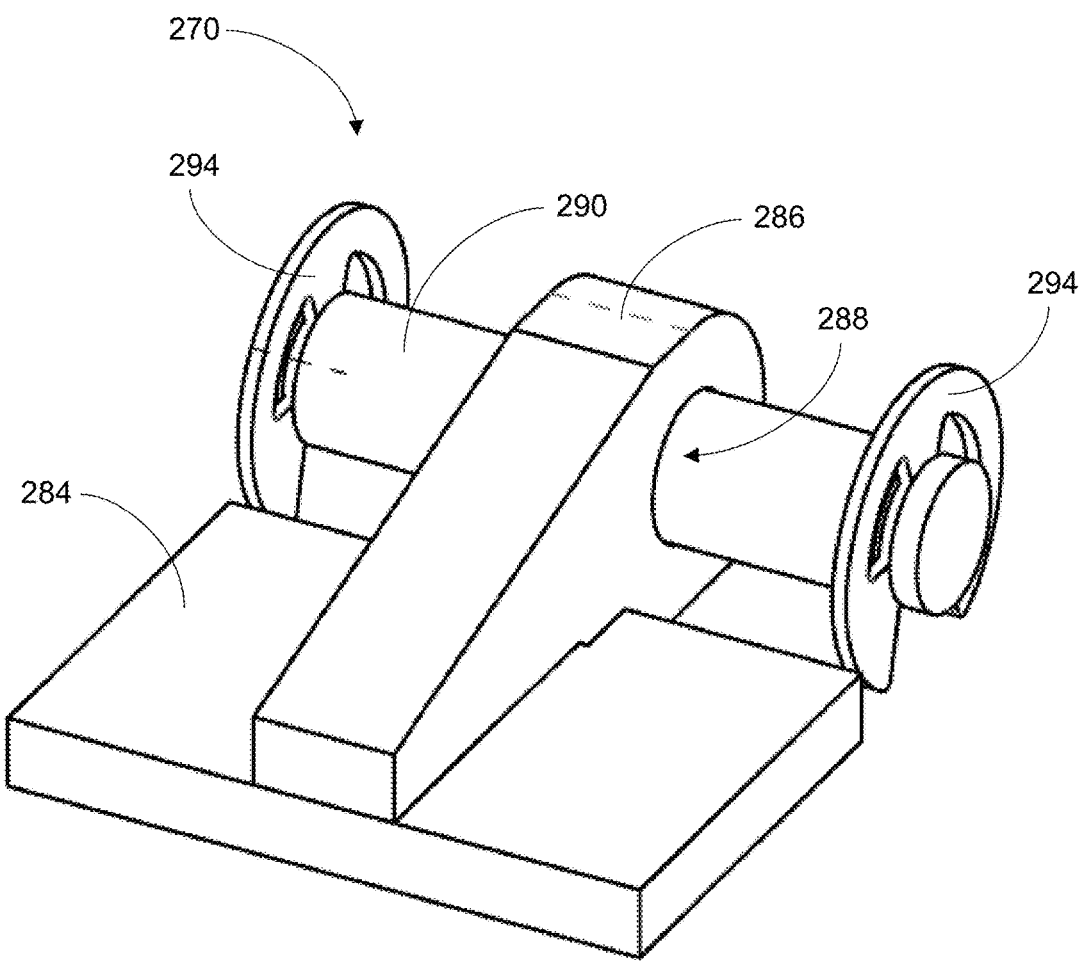
FIG. 16 depicts perspective view a lift strut mount assembly of a connecting assembly of a lockbox stand according to the exemplary embodiments of the present invention depicted in FIGS. 9-15.

The lift strut mount 270 is depicted in FIG. 16 and includes a mounting plate 284 and a nose projection 286 with a peripheral bore 288 therethrough, in preferable embodiments. The mounting plate 284 and nose projection 286 are preferably permanently attached, via welding or other, similar means. When the lockbox stand 210 is fully assembled, the mounting plate 284 attaches to the rear-facing side of the post assembly's 212 primary post 214, preferably near the lower end of the primary post 214 adjacent to the lateral extension portion 224. As depicted in FIG. 14, the lift strut mount 270 is preferably located sufficiently low on the primary post 214 such that it is retained in the interior of the housing 234, preferably just below the insertion slot 240, when the lockbox stand 210 is assembled and in the upright position.

The lift strut mount 270 is engageable by the lift strut 272, and specifically connects to the upper lift strut fitting 274 via an attachment pin 290. The attachment pin 290 (as well as other pins included in the invention's design) preferably includes disk-shaped clips 294 on either end to prevent inadvertent removal of the pin 290. Other manners of preventing inadvertent removal of the pin 290 will be recognized by those of skill in the art and are also available for use with the present invention, including the use of a bolt and nut attachment or the like. To connect the lift strut 272 and lift strut mount 270, the lift strut mount's 270 peripheral bore 288 is put in alignment with the lateral bore 292 extending through the upper lift strut fitting 274, which are preferably substantially similar in size and shape, and pin 290 is inserted through both engaging the lift strut mount 270 to the lift strut 272. It is important that the upper lift strut fitting 274 can rotate relative to the lift strut mount 270 as the post assembly 212 is adjusted between the upright and collapsed positions, so peripheral bore 288 and lateral bore 292 are both preferably circular and pin 290 is preferably cylindrical in shape, though other designs and arrangements are likewise available, as those of skill in the art will recognize.

Also preferably included in the connection assembly 252 are means for latching 296 the post assembly 212 in the collapsed position. The latching means 296 prevent the post assembly 212 from springing up into the upright position due to the pressure created by the translational strut portion's 278 biasing means. Those of skill in the art will recognize the various manners of latching the post assembly 212 in the collapsed position, all of which are available to the present invention. Preferable embodiments of the lockbox stand 210 that employ latching means 296 may, for example, incorporate one or more of the projections 220 attached to the rear-facing side of the primary post 214 into the latching operation.

Figure 17:
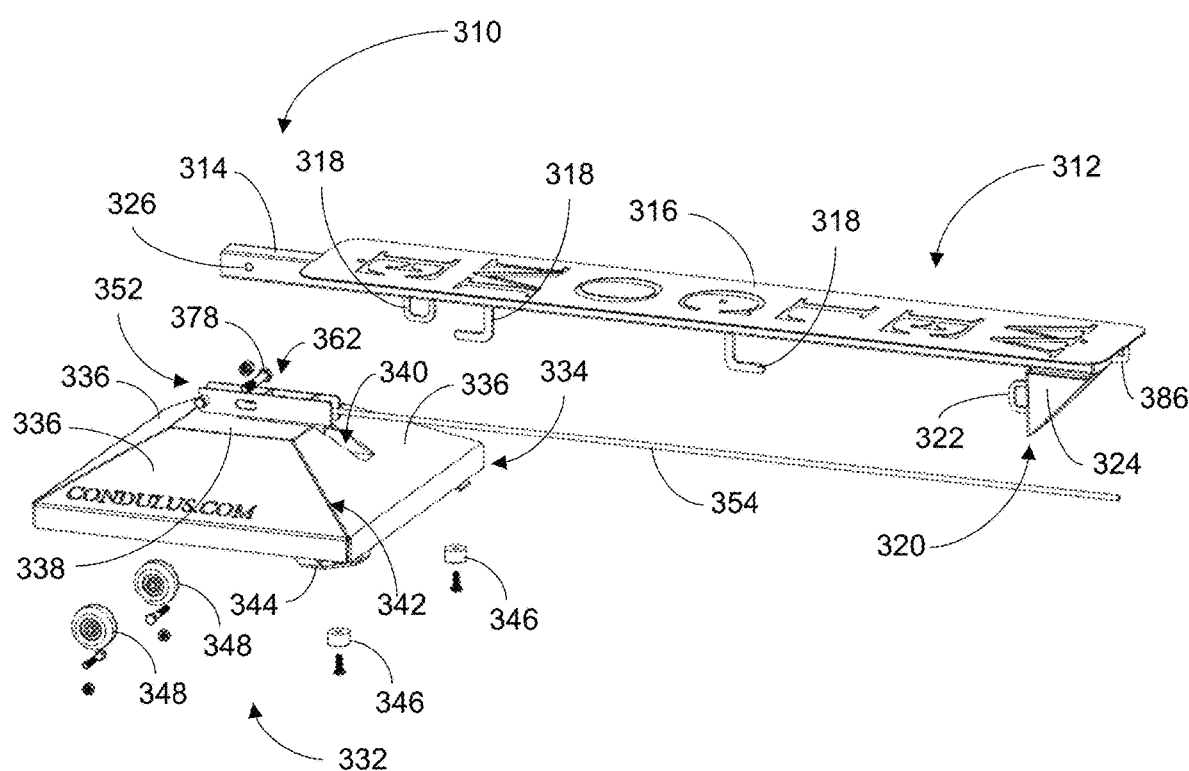
FIG. 17 depicts an exploded perspective view of a lockbox stand according to exemplary embodiments of the present invention.

Another preferable embodiment of a lockbox stand 310 according to the present invention is depicted in FIG. 17. As depicted, the lockbox stand 310 preferably includes a post assembly 312, a base assembly 332, and a connection assembly 352 for connecting the post assembly 312 to the base assembly 332. The post assembly 312 preferably includes a primary post 314 upon which a sign or signs 316 may be mounted, preferably upon the front-facing side of the primary post 314. The signs 316 are preferably mountable to the primary post 314 through various means that will be known to those of skill in the art, including through welding, bolt or other mechanical connection, or by magnetic connection for easy installation and removal.

Extending from the rear-facing side of the primary post 314, opposite the side that the signs 316 attach to, are one or more projections 318. The projections 318 provide means to attach, hang, or otherwise connect items, such as a real estate lockbox device, to the lockbox stand 310. Preferable embodiments of the post assembly 312 include an attachment mechanism 320 specifically designed to connect a lockbox device to the lockbox stand 310. As depicted in FIG. 17, the attachment mechanism 320 preferably extends from the rear-facing side of the primary post 314 near its top and preferably includes a closed hook 322 that is permanently affixed to the primary post 314 so as to secure the lockbox device and prevent theft or other misplacement of the lockbox device.

In some preferable embodiments, the closed hook 322 is welded directly to the primary post 314 while, in others, the closed hook 322 is welded to an upper extension 324 creating a surface for attachment of the closed hook 322, as depicted in FIG. 17. Such an arrangement of the attachment mechanism 320 improves the security of any attached lockbox or other key-containing device by eliminating the application of shearing force upon the closed hook 322 when the lockbox stand 310 is in use in the upright position. Those of skill in the art will recognize additional or alternative arrangements for securing a key to the primary post 314 and reducing the likelihood of theft or loss.

Near the bottom of the primary post 314 is a post attachment bore 326 sized and positioned to receive a pin 378 that attaches the post assembly 312 to the connection assembly 352 and the base assembly 332. The primary post 314 is preferably hollow and sized to snugly receive substantial portions of the connection assembly 352, with the pin 378 extending through the post attachment bore 326 and similarly situated apertures 360, 366 in the connection assembly 352. By extending into the hollow primary post 314, the connection assembly 352 operates to connect the post assembly 312 to the base assembly 332 and to facilitate transitioning the lockbox stand 310 between the upright, in-use position and the flat, storage position (depicted in FIG. 18), and at various positional angles therebetween, in some preferable embodiments.

Figure 18A:
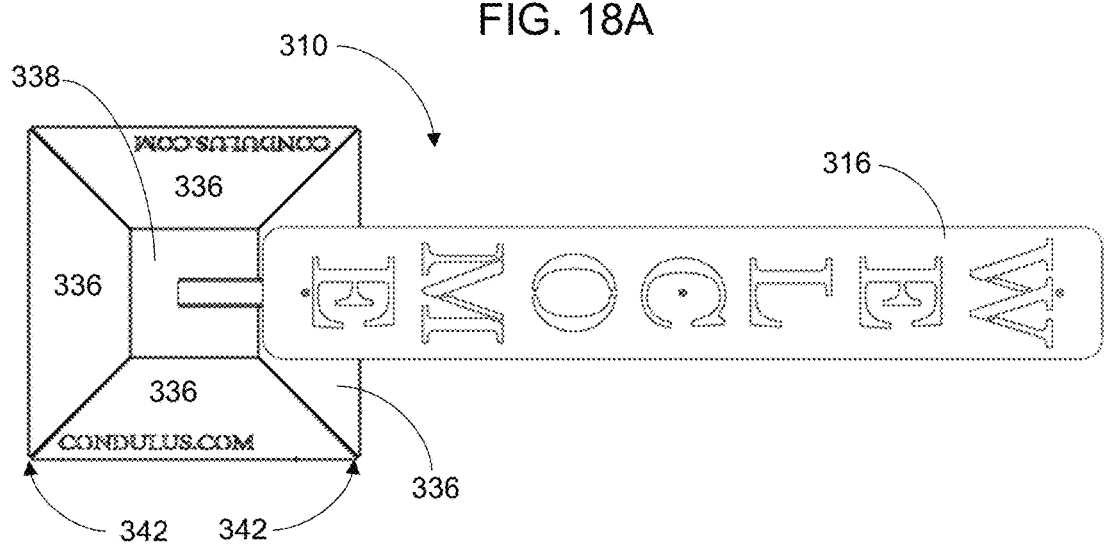
FIG. 18A depicts an orthogonal view from above of a lockbox stand in the collapsed position according to the exemplary embodiments of the present invention depicted in FIG. 17.
Figure 18B:
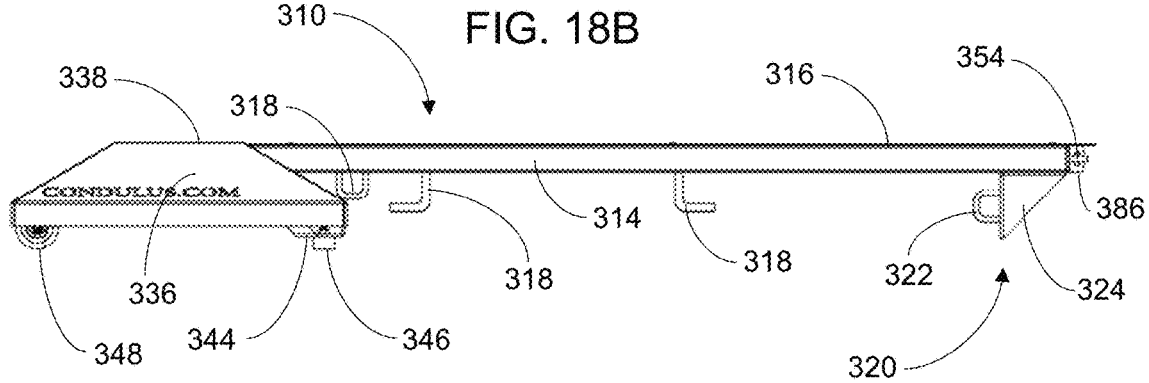
FIG. 18B depicts an orthogonal view from the side of a lockbox stand in the collapsed position according to the exemplary embodiments of the present invention depicted in FIGS. 17 and 18A.

The base assembly 332 preferably includes a housing 334 composed of a plurality of side panels 336 and a top panel 338. As those of skill in the art will recognize, the number of side panels 336 will determine the shape of the housing 334, with preferable shapes including a square, rectangle, hexagonal, or other multilateral shapes. The preferable embodiment of the housing 334 depicted in FIGS. 17-19 is square. The housing 334 includes an insertion slot 340 preferably extending from the approximate center of the housing 334 through to an edge of the top panel 338 and into one of the side panels 336, as depicted in FIGS. 17 and 19. Each side panel 336 abuts and connects to another at transition demarcations 342, thereby forming the enclosed housing 334 within which the connection assembly 352 resides when the lockbox stand 310 is assembled. Also stored within the housing 334 is a cable, in preferable embodiments, which can be used to attach and secure the lockbox stand 310 to the real property to avoid theft or misplacement.

The base assembly 332 also preferably includes one or more feet 346 and one or more wheels 348 connected to the lower edge of the housing 334. The feet 346 are preferably removably attachable to foot-connection portions 344, as depicted in FIGS. 17-18. The foot connection portions 344 and feet 346 are preferably located near each of the transition demarcations 342, although other arrangements will be recognized by those of ordinary skill in the art, including arrangements employing more or less feet 346. Wheels 348 are likewise preferably removably attached to the housing 334 through the use of wheel housings 350. The wheel housings 350 allow the wheels 348 to rotate freely relative to the housing 334 to facilitate locating the lockbox stand 310 as desired.

Figure 20A:
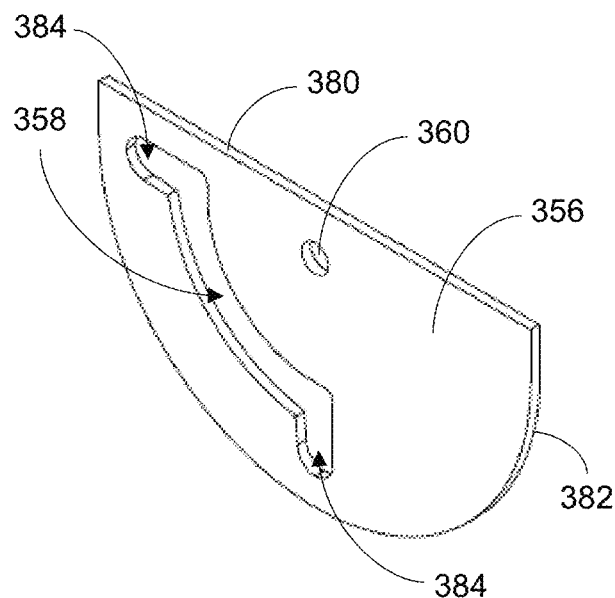
FIG. 20A depicts an isometric view of a locking plate of a lockbox stand according to the exemplary embodiments of the present invention depicted in FIGS. 17-19.
Figure 20B:
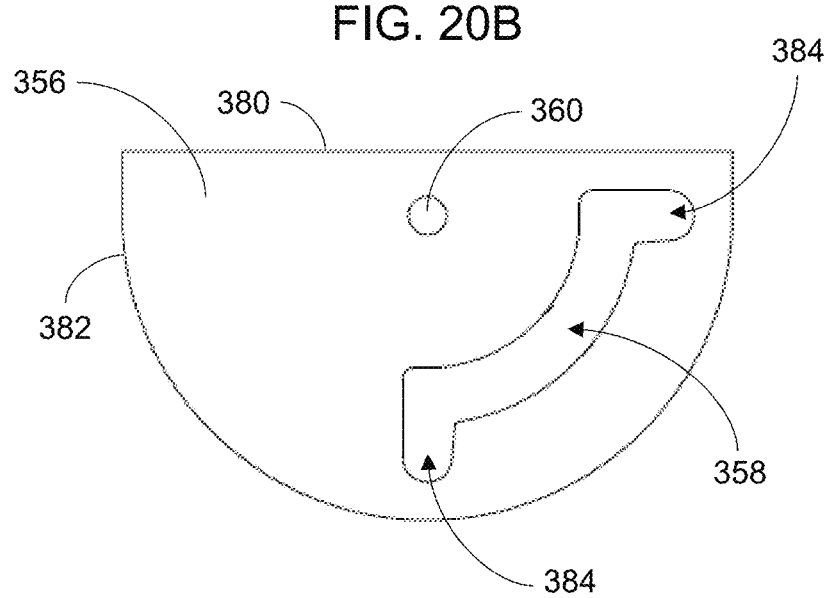
FIG. 20B depicts an orthogonal view from the side of a locking plate of a lockbox stand according to the exemplary embodiments of the present invention depicted in FIGS. 17-19 and 20A.

Preferable embodiments of the connection assembly 352 include two locking plates 356, a post retention assembly 362, and a retention bar 354 extending therefrom. The locking plates 356 reside within the housing 334 when the lockbox stand is assembled and attach to each side of the primary post 314 via pin 378. The locking plates 356 each include a central bore 360 preferably located centrally near the locking plate's linear edge 380 as depicted in FIG. 20. The central bore 360 aligns with the primary post's 314 post attachment bore 326 such that pin 378 can pass through each to connect the post assembly 312 to the connection assembly 352. Each of the locking plates 356 also has a circumferential aperture 358 located along a substantial portion of the circumference of the locking plates 356 near their circumferential edge 382, as depicted in FIGS. 19C and 20. The circumferential apperture 358 includes two or more positioning slots 384 to facilitate transitioning the lockbox stand 310 between upright and storage positions, and at various points in between in some preferable embodiments.

Figure 21A:
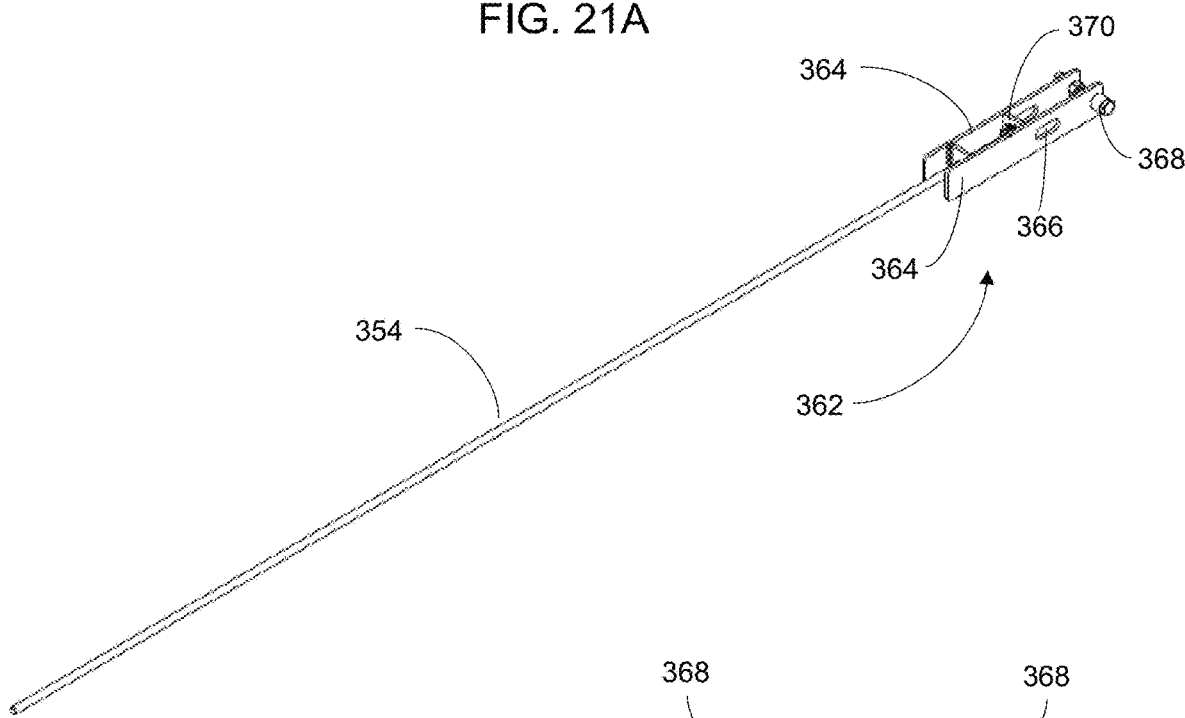
FIG. 21A depicts a perspective view of a post attachment assembly of a lockbox stand according to the exemplary embodiments of the present invention depicted in FIGS. 17-20.
Figure 21B:
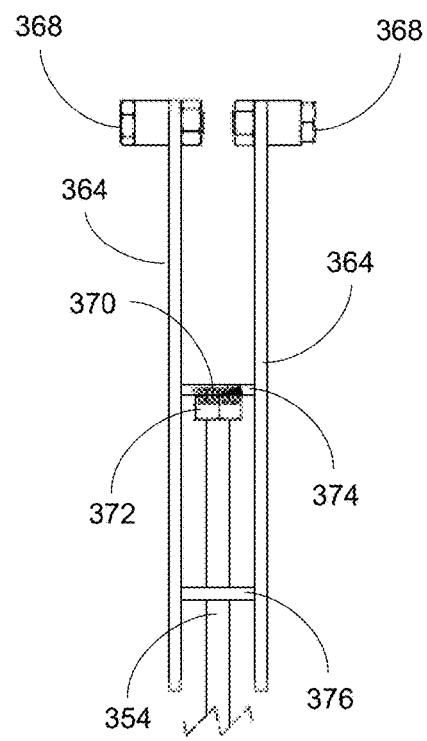
FIG. 21B depicts a partial orthogonal view from the front of a post attachment assembly of a lockbox stand according to the exemplary embodiments of the present invention depicted in FIGS. 17-20 and 21A.
Figure 21C:
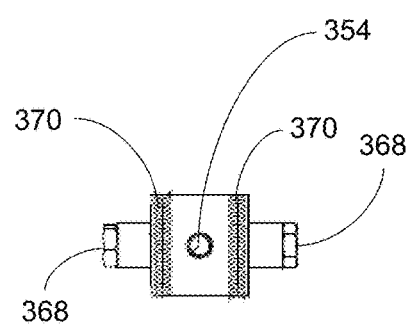
FIG. 21C depicts an orthogonal view from the top of a post attachment assembly of a lockbox stand according to the exemplary embodiments of the present invention depicted in FIGS. 17-20 and 21A-B.

Preferable embodiments of the post retention assembly 362 and retention bar 354 are depicted in FIG. 21. The retention bar 354 preferably extends substantially linearly from one end of the post retention assembly 362, as depicted. At the opposite end of the post retention assembly 362 reside one or more positioning knobs 368. The retention bar extends through the entire length of the hollow primary post 314 of the post assembly 312 when the lockbox stand 310 is assembled, with a small portion of the retention bar 354 extending out of the top of the primary post 314 such that a user can access, grab, and pull on the end of the retention bar 354. The post retention assembly 362 includes two parallel rectangular plates 364 separated by at least a first spacer 374 and a second spacer 376. As those of ordinary skill in the art will recognize additional spacers may be employed without departing from the principles of the present invention.

Figure 18C:
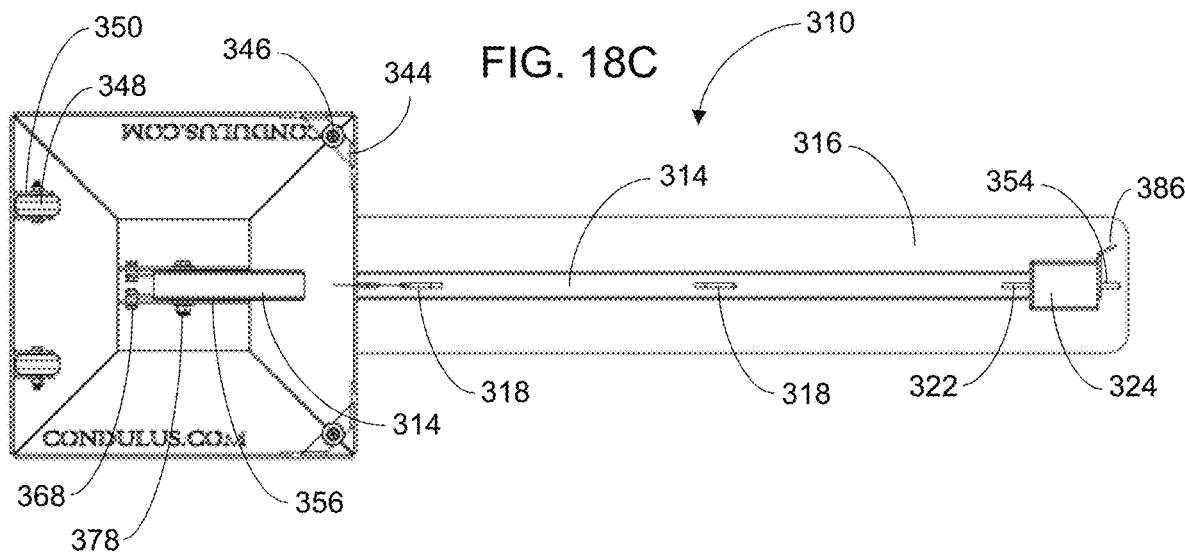
FIG. 18C depicts an orthogonal view from below of a lockbox stand in the collapsed position according to the exemplary embodiments of the present invention depicted in FIGS. 17 and 18A-B.

The first and second spacers 374, 376 are sized and oriented to separate the two parallel rectangular plates 364 at a distance that creates a snug fit between the post retention assembly 362 and the hollow primary post 314 when the lockbox stand 310 is assembled and portions of the post retention assembly 362 reside within the hollow primary post 314. Because the positioning knobs 368 extend beyond the outer surfaces of the rectangular plates 364, the positioning knobs 368 cannot enter the hollow primary post 314, as shown in FIG. 18C. Instead, the post retention assembly 362 is inserted within the hollow primary post 314 until the oblong apertures 366 on the rectangular plates 364 align with the post attachment bore 326 located at the lower end of the primary post 314.

When fully assembled, the central bores 360 of the locking plates 356 also align with the post attachment bore 326 and the oblong apertures 366, and each part is connected using pin 378. The locking plates 356 being preferably affixed to the housing 334, the pin 378 thus rotatably connects each of the post assembly 312, base assembly 332, and connection assembly 352 to one another. The lower end of the primary post 314, the locking plates 356, and the post retention assembly 362 all reside entirely within the housing 334 when the lockbox stand 310 is assembled, with only the post assembly 312 being visible and accessible from outside the housing 334.

When the lockbox stand 310 is fully assembled, the positioning knobs 368 of the post retention assembly 362 are slidably inserted within the circumferential aperture 358. When the post assembly 312 is lying flat in the storage position, for example, the positioning knobs 368 are locked into the positioning slots 384 closest to the linear edge 380 of the locking plates 356. Likewise, when the post assembly 312 is upright and in use, the positioning knobs 368 are locked into the positioning slots 384 located near the center of the circumferential edge 382 of the locking plates 356. A biasing mechanism 370 employed by the post retention assembly 362 ensures that the rectangular plates 364 and their associated positioning knobs 368 are continuously encouraged toward the positioning slots 384.

To transition the lockbox stand 310 between the upright, in-use position and the flat, storage position, and other positions therebetween in some preferable embodiments, the user pulls on the end of the retention bar 354 disposed above the top of the hollow primary post 314. Doing so relieves the biasing pressure created by the biasing mechanism 370 and pulls the rectangular plates 364 and their associated positioning knobs 368 toward the top end of the primary post 314, withdrawing the positioning knobs 368 from the positioning slots 384 allowing them to slide freely within the circumferential aperture 358 between positioning slots 384 and allowing the post assembly 312 to rotate relative to the base assembly 332 thereby. Some preferable embodiments of the post assembly 312 include a retention bar grip 386 to assist the user in pulling the retention bar 354 to permit the transition of the lockbox stand 310 between positions. As noted, and as will be understood to those of ordinary skill in the art, while FIGS. 19C and 20 show only two positioning slots 384 at each end of the circumferential aperture 358 (associated with the upright and flat positions for the lockbox stand 310), additional slots may be included to permit the post assembly to lock into place at an angle between upright and flat.

While the present invention has been described with reference to particular embodiments and arrangements of parts, features, and the like, it is not limited to these embodiments or arrangements. Indeed, modifications and variations will be ascertainable to those of skill in the art, all of which are inferentially and inherently included in these teachings.

What is claimed is:

1. A lockbox stand device for securely retaining real estate access keys, comprising:
    a post assembly comprising a primary post and one or more projections for securely attaching a lockbox device, the primary post being hollow and comprising a bore near a lower end, the bore being sized and oriented to accommodate a pin;
    a base assembly comprising three or more side panels and a top panel forming a housing, the top panel and at least one of the side panels having a slot extending through a portion thereof;
    a connection assembly comprising at least two locking plates, a retention bar, and a post-attachment assembly comprising at least two rectangular plates separated by one or more spacers, each of the at least two rectangular plates comprising an oblong aperture sized and oriented to accommodate the pin and a positioning knob located near a first lengthwise end;
    each of the at least two locking plates comprising a linear edge affixed to an underside of the top panel of the base assembly, a circumferential aperture comprising two or more positioning slots, and a central bore sized and oriented to accommodate the pin;
    the post-attachment assembly further comprising a biasing mechanism and being sized to slidably reside partially within the hollow primary post, the retention bar extending from a second lengthwise end of the post-attachment assembly and through the entire length of the hollow primary post, a portion of the retention bar extending beyond an upper end of the primary post, the biasing mechanism biasing the positioning knobs of the at least two rectangular plates into the positioning slots of the circumferential aperture, locking the post assembly into one of an upright or collapsed position;
    the post assembly being transition-able between upright and collapsed positions by pulling on the portion of the retention bar extending beyond the upper end of the primary post and manually rotating the post assembly relative to the base assembly, and locking the post assembly back into one of the upright or collapsed positions by releasing the retention bar.

2. The lockbox stand device of claim 1, wherein the base assembly further comprises a cable that is coiled within the housing when stored and is extended to secure the lockbox stand device to a structure or other immovable object on the associated real property when in use.

3. The lockbox stand device of claim 1, wherein the base assembly further comprises one or more wheels extending below a lower edge of the housing and one or more wheel housings to attach the one or more wheels to the housing.

4. The lockbox stand device of claim 1, wherein the base assembly further comprises one or more feet extending below a lower edge of the housing and one or more foot-connection portions to connect the one or more feet to the housing.

5. The lockbox stand device of claim 1, wherein the post assembly further comprises one or more signs attachable to a front facing surface of the primary post.

6. The lockbox stand device of claim 5, wherein the projections of the post assembly extend from a rear facing surface of the primary post.

7. The lockbox stand device of claim 1, wherein the post assembly further comprises a bar retention grip to facilitate pulling on the portion of the retention bar extending beyond the upper end of the primary post.

8. A lockbox stand device for securely retaining real estate access keys, comprising:
- a post assembly comprising a primary post, one or more signs removably attachable to a front-facing surface of the primary post, and one or more projections for securely attaching a lockbox device projecting from a rear-facing surface of the primary post;
- a base assembly comprising one or more panels forming a housing;
- a connection assembly rotatably connecting the post assembly to the base assembly, the connection assembly comprising at least one cylindrical pin installed through one or more apertures in each of the post assembly, the base assembly, and the connection assembly;
- wherein the lockbox stand device is position-able among at least two positions, an upright position wherein the primary post is substantially perpendicular to the base assembly and a collapsed position wherein the post assembly is substantially parallel to the base assembly.

9. The lockbox stand device of claim 8, wherein the connection assembly further comprises a biasing mechanism that operates to assist a user in transitioning the lockbox stand device among the at least two positions.

10. The lockbox stand device of claim 9, wherein the connection assembly further comprises at least two locking plates, a retention bar, and a post-attachment assembly comprising at least two rectangular plates separated by one or more spacers, each of the at least two rectangular plates comprising an oblong aperture sized and oriented to accommodate the pin and a positioning knob located near a first lengthwise end of the post-attachment assembly, the retention bar extending from a second lengthwise end of the post-attachment assembly.

11. The lockbox stand device of claim 10, wherein each of the at least two locking plates comprises a linear edge affixed to an underside of a top panel of the base assembly, a central bore sized and oriented to accommodate the pin, and a circumferential aperture comprising two or more positioning slots associated with the at least two positions.

12. The lockbox stand device of claim 11, wherein:
- the primary post is hollow and comprises a bore near a lower end;
- the post-attachment assembly slidably resides partially within the primary post such that the bore of the primary post, the oblong apertures of the at least two rectangular plates, and the central bores of the at least two locking plates are aligned to receive the pin, creating a rotatable connection between the post assembly, the base assembly, and the connection assembly;
- the retention bar extends through the entire length of the primary post, and a portion of the retention bar extends beyond an upper end of the primary post;
- the biasing mechanism of the connection assembly propels the positioning knobs of the at least two rectangular plates of the post-attachment assembly into the positioning slots of the circumferential apertures of the at least two locking plates; and
- the lockbox stand device is transition-able among the at least two positions by pulling on the portion of the retention bar extending beyond the upper end of the primary post, retracting the positioning knobs from the positioning slots, and manually rotating the post assembly relative to the base assembly.

13. The lockbox stand device of claim 12, wherein the post assembly further comprises a bar retention grip located at the upper end of the primary post to facilitate pulling on the portion of the retention bar extending beyond the upper end of the primary post.

14. The lockbox stand device of claim 9, wherein:
- the post assembly further comprises a disk plate affixed at a lower end of the primary post, the disk plate comprising at least two positioning notches associated with the at least two positions;
- the connection assembly further comprises a latch slider;
- the biasing mechanism propels the latch slider into the positioning notches of the disk plate; and
- the at least two positioning notches being designed such that manual manipulation of the post assembly forces the latch slider toward the biasing mechanism and releases the latch slider from the at least two positioning notches, the lockbox stand device is transition-able among the at least two positions by manually rotating the post assembly relative to the base assembly.

15. The lockbox stand device of claim 14, wherein the connection assembly further comprises a post-support assembly, a forked base support, and a latch sub-assembly;
- the post-support assembly comprising a bottom panel and two side panels, the post-support assembly thus having a U-shaped cross-sectional design, the two side panels comprising central bores located near an upper edge and a lengthwise slot extending from a first lengthwise edge through a substantial length of each side panel to slidably receive the latch slider, the bottom panel comprising a lengthwise slot extending from a first lengthwise edge through a substantial length of the bottom panel to slidably receive the disk plate of the post assembly;
- the forked base support comprising a horizontal forked portion and a vertical extension portion, the vertical extension portion comprising one or more lateral projections each with a centrally located projection bore, the horizontal forked portion comprising one or more prongs and a substantially horizontal portion, the one or more prongs being provided at an angle up to 45 degrees relative to the substantially horizontal portion; and
- the latch sub-assembly comprising a latch shroud comprising upper and lower extensions, the lower extensions comprising centrally located bores therethrough.

16. The lockbox stand device of claim 15, wherein:
- the primary post further comprises a lower bore located near its lower end;
- the central bores of the two side panels of the post-support assembly and lower bore of the primary post are aligned to receive the pin, creating a rotatable connection between the post assembly, the base assembly, and the connection assembly;
- the upper edges of the two side panels of the post support assembly are affixed to an underside of the at least one panel forming a housing;
- the base assembly further comprises one or more notches in a lower edge of the at least one panel forming the housing, the one or more notches being sized and oriented to receive the one or more prongs of the horizontal forked portion of the forked base support; and
- the centrally located projection bores of the one or more lateral projections of the vertical extension portion of the forked base support and the centrally located bores of the lower extensions of the latch shroud of the latch sub-assembly align to receive a second pin, connecting the post-support assembly, forked base support, and latch sub-assembly of the connection assembly.

17. The lockbox stand device of claim 9, wherein the connection assembly further comprises an internal frame affixed within the housing of the base assembly and a lift assembly comprising a lift strut and a lift strut mount affixed to the primary post near a lower end, the lift strut comprising a translational strut with an upper portion that rotatably connects to the lift strut mount and a lower portion that rotatably connects to the internal frame, the biasing means of the connection assembly propelling the upper portion of the translational strut away from the lower portion of the translational strut and thereby assisting a user in manually rotating the post assembly relative to the base assembly to transition the lockbox stand device among the at least two positions.

18. The lockbox stand device of claim 17, wherein:
the primary post further comprises a lateral extension located at the lower end and a lateral bore located substantially centrally on the lateral extension;
the internal frame of the connection assembly comprises at least two frame plates each comprising a central bore and a lateral bore;
the central bores of the at least two frame plates and the lateral bore of the lateral extension of the primary post align to receive the pin, creating a rotatable connection between the post assembly, the base assembly, and the connection assembly;
the lateral bores of the at least two frame plates align with a lateral bore in the lower portion of the translational strut to receive a second pin, rotatably connecting the lift strut to the internal frame; and
one or more lateral bores in the upper portion of the translational strut align with one or more connection bores in the lift strut mount to receive a third pin, rotatably connecting the lift strut to the lift strut mount.

19. The lockbox stand device of claim 17, wherein:
the internal frame of the connection assembly further comprises one or more handles;
the at least one panel of base assembly comprises one or more handle openings associated with the one or more handles; and
the base assembly further comprises one or more handle shrouds located within the housing to surround the one or more handles and create an enclosed handle cavity to facilitate transporting the lockbox stand device.

20. The lockbox stand device of claim 8, wherein the base assembly further comprises a cable for securing the lockbox stand device, one or more stabilization feet, and one or more wheels, the cable being affixed to and stowable within the housing.

\* \* \* \* \*